(12) United States Patent
Raue et al.

(10) Patent No.: US 11,026,435 B2
(45) Date of Patent: Jun. 8, 2021

(54) TEXTURED NON-POROUS BARRIER TRANSFER CASING

(71) Applicant: Viscofan S.A., Navarra (ES)

(72) Inventors: Frank Raue, Karlsruhe (DE); Jeremey Hinkle, Blue Earth, MN (US)

(73) Assignee: Viscofan S.A., Navarra (ES)

( * ) Notice: Subject to any disclaimer, the term of this patent is extended or adjusted under 35 U.S.C. 154(b) by 231 days.

(21) Appl. No.: 16/055,472

(22) Filed: Aug. 6, 2018

(65) Prior Publication Data

US 2020/0037623 A1 Feb. 6, 2020

(51) Int. Cl.
*A23C 13/00* (2006.01)
*A22C 13/02* (2006.01)
*A22C 13/00* (2006.01)

(52) U.S. Cl.
CPC .......... *A22C 13/0013* (2013.01); *A22C 13/02* (2013.01); *A22C 2013/004* (2013.01);
(Continued)

(58) Field of Classification Search
CPC ............... A22C 13/0013; A22C 13/02; A22C 2013/004; A22C 2013/0053; A22C 2013/0059; A22C 2013/0076; A22C 2013/0079; A22C 2013/0089; A22C 2013/0096; A22C 2013/026; A22C 2013/028; A22C 2013/0046; A22C 2013/005; A22C 2013/0063; A22C 2013/002; A22C 13/00; B32B 27/00; B32B 27/08; B32B 5/18; B32B 5/00; B32B 1/08; C07D 487/04; C07D 401/12
USPC ... 428/141, 220, 480, 523, 172, 195.1, 35.7, 428/339, 412, 516, 212, 483, 500, 522, 428/304.4, 421, 40.1, 156, 35.2, 213, 428/411.1, 515, 216, 423.1, 343, 34.1, 428/447, 138, 215, 323, 413, 319.7, 335, 428/336, 426, 461, 476.9, 318.4, 328, 428/332, 36.91, 217, 316.6, 349, 437, 428/474.4, 475.2, 501, 520, 532, 95, 166, 428/167, 174, 201, 36.9, 422, 424.2, 43, (Continued)

(56) References Cited

U.S. PATENT DOCUMENTS 4,786,512 A * 11/1988 Erk .................... A22C 13/0013
426/105
4,883,677 A 11/1989 Aiga et al.
(Continued)

FOREIGN PATENT DOCUMENTS

DE 3526394 C2 10/1987
DE 3741329 C1 3/1989
(Continued)

OTHER PUBLICATIONS

Office Action Restriction for U.S. Appl. No. 16/055,443, dated Dec. 8, 2020, 6 Pages.

*Primary Examiner* — Gerard Higgins
*Assistant Examiner* — Kevin C Ortman, Jr.
(74) *Attorney, Agent, or Firm* — Maine Cernota & Rardin

(57) ABSTRACT

The present disclosure provides a functional additive transferring (co)extruded thermoplastic food casing having a water vapor barrier and/or oxygen barrier effect wherein an inside surface of the thermoplastic food casing has a textured surface which forms a three-dimensional pattern of higher and lower retaining capacity for a functional additive.

16 Claims, 1 Drawing Sheet

(52) U.S. Cl.
CPC ............... *A22C 2013/0053* (2013.01); *A22C 2013/0059* (2013.01); *A22C 2013/0076* (2013.01); *A22C 2013/0079* (2013.01); *A22C 2013/0089* (2013.01); *A22C 2013/0096* (2013.01); *A22C 2013/026* (2013.01); *A22C 2013/028* (2013.01)

(58) Field of Classification Search
USPC .... 428/458, 517, 521, 910, 137, 219, 315.9, 428/317.9, 319.3, 327, 334, 354, 36.92, 428/41.8, 424.8, 430, 441, 457, 476.3, 428/519, 161, 184, 192, 196, 297.4, 428/314.4, 314.8, 317.1, 317.3, 319.9, 428/337, 423.5, 423.7, 424.4, 451, 474.7, 428/475.5, 481, 482, 518, 537.1, 97, 164, 428/178, 182, 186, 198, 221, 315.5, 329, 428/331, 35.4, 36.5, 36.6, 41.3, 476.1, 428/704, 88, 116, 119, 151, 157, 158, 17, 428/189, 1.1, 1.3, 206, 210, 29, 309.9, 428/317.7, 319.1, 325, 326, 330, 355 R, 428/35.5, 36.4, 409, 423.3, 424.6, 442, 428/446, 448, 473.5, 475.8, 48, 507, 512, 428/537.5, 77, 92, 101, 113, 114, 118, 428/121, 13, 131, 133, 135, 136, 143, 428/146, 15, 159, 162, 173, 194, 199, 428/1.2, 200, 203, 204, 207, 209, 218, 428/292.1, 298.1, 299.1, 299.4, 299.7, 428/310.5, 311.11, 313.3, 315.7, 318.6, 428/324, 32.1, 32.11, 32.16, 32.38, 32.5, 428/32.52, 333, 338, 340, 347, 34.2, 34.3, 428/34.4, 352, 355 BL, 355 EN, 35.3, 428/35.8, 36.1, 376, 396, 4, 40.2, 40.6, 428/415, 417, 418, 419, 425.5, 425.6, 428/425.8, 425.9, 428, 429, 432, 435, 428/436, 44, 450, 452, 454, 462, 463, 428/474.9, 477.7, 51, 513, 524, 53, 534, 428/535, 536, 560, 57, 59, 600, 606, 63, 428/64.1, 66.5, 68, 702, 76, 78, 82, 87, 428/89, 91, 914, 96, 98, 99, 344
See application file for complete search history.

(56) References Cited

U.S. PATENT DOCUMENTS

| | | | |
|---|---|---|---|
| 5,597,606 | A | 1/1997 | Kramer |
| 7,615,270 | B2 | 11/2009 | Lee et al. |
| 7,666,484 | B2 | 2/2010 | Arias Lopez |
| 2006/0003058 | A1 | 1/2006 | Koenig et al. |
| 2009/0155328 | A1* | 6/2009 | Lee ................. B32B 33/00 424/405 |
| 2009/0214722 | A1 | 8/2009 | Henze-Wethkamp et al. |
| 2010/0227164 | A1 | 9/2010 | Hihnala et al. |
| 2016/0120195 | A1* | 5/2016 | Itoshiro ............ A22C 13/00 428/34.8 |
| 2017/0267432 | A1* | 9/2017 | Chen ................ B65D 75/30 |

FOREIGN PATENT DOCUMENTS

| | | |
|---|---|---|
| DE | 10124581 A1 | 11/2002 |
| EP | 0738471 A2 | 10/1996 |
| EP | 0992194 A1 | 4/2000 |
| EP | 1164856 A1 | 1/2002 |
| EP | 1192864 A2 | 4/2002 |
| EP | 1556285 A1 | 4/2004 |
| EP | 1911352 A1 | 4/2008 |
| EP | 1955596 B1 | 8/2008 |
| EP | 2478772 A1 | 7/2012 |
| EP | 3014997 A1 | 5/2016 |

* cited by examiner

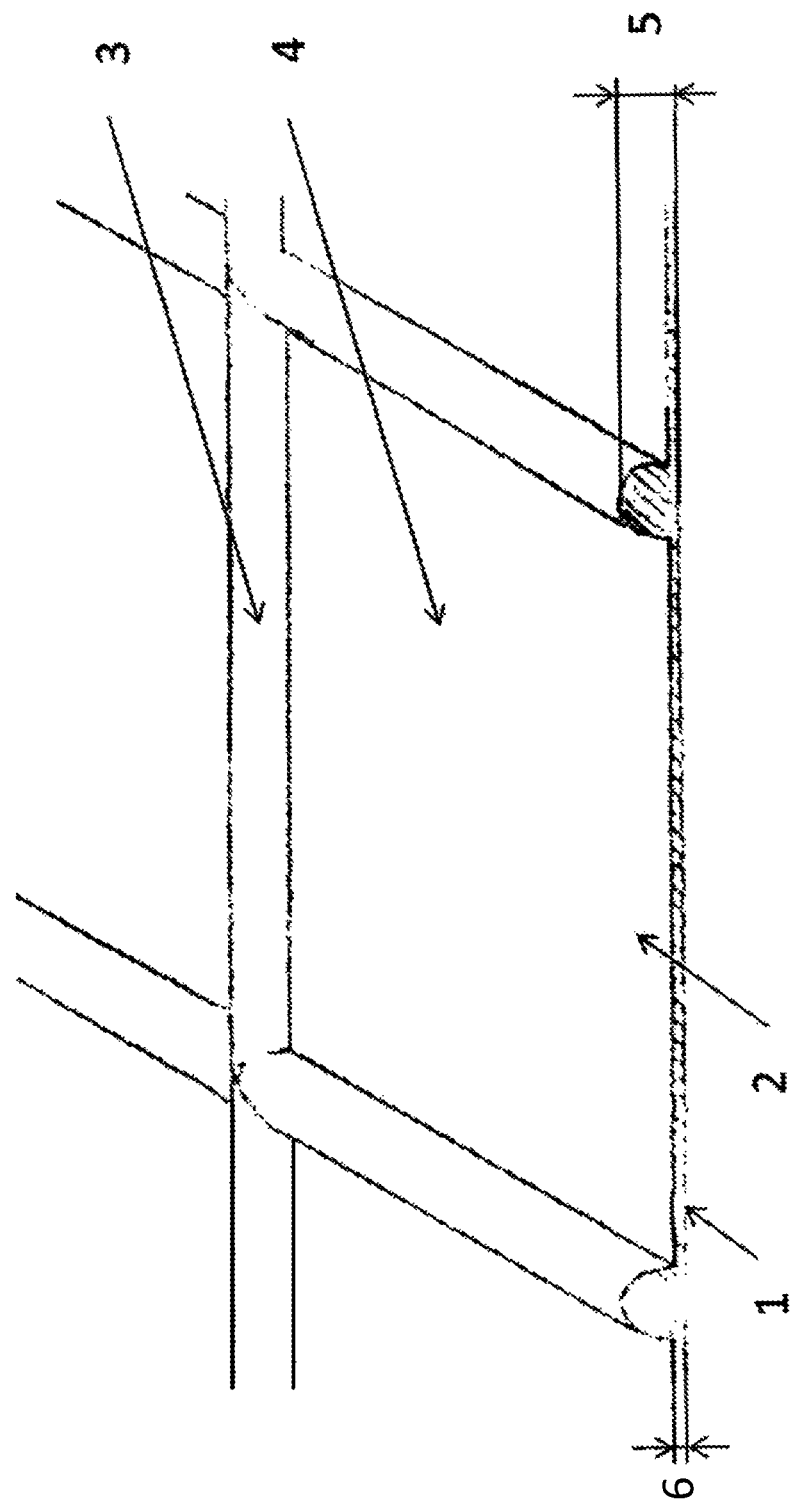

TEXTURED NON-POROUS BARRIER TRANSFER CASING

TECHNICAL FIELD OF THE INVENTION

The present invention relates to a (co)extruded thermoplastic food casing having a textured surface, a method for producing said (co)extruded thermoplastic food casing and use of said (co)extruded thermoplastic food casing such as for example a sausage casing, which food casings are able to transfer functional food additives such as flavors or colors onto the enclosed foodstuff, especially in the production of meat, cheese or fish products.

BACKGROUND ART OF THE INVENTION

In the production of meat products, smoke treatment has a long tradition for taste and preservation reasons. In said tradition the smoking of the products in smoking rooms or chambers is widely used. However, in such a case the casings need to be permeable for the smoke, which means that the casing has a low water vapor barrier so that the meat product can lose weight during cooking and storage. To avoid weight loss during storage a secondary packaging may become necessary. However, smoke deposits on the walls and the ceiling of the smoking rooms can affect the appearance of meat products in the following cooking cycle. To avoid these drawbacks of a smoke treatment through a smoke-permeable casing, the inside of casings, which offer a sufficient barrier to water vapor, has been coated or impregnated with liquid smoke, but also with color solutions, e.g. solution on a caramel basis, or seasonings.

A special category of often smoke-treated meat products are products which are stuffed into a net and cooked with the net on, stabilizing and shaping the product and giving the final product a textured appearance on its surface. The final product is then sold in a packaged form in a secondary package with the net on the product or—for the convenience of the consumer—with the net already stripped off at the producer. Even when the product is sold in slices, the slices still show on the circumference a textured variation in color and—depending on the degree of overstuffing the net—a more or less pronounced waviness of the circumference, resulting from the meat product bulging through the meshes of the net. The variation in color results from the contact of the net with the product so that in this contact pattern the access for smoke to the surface of the product is reduced.

Nettings are available in different shapes, sizes and smoke colors. The woven nets can be found e.g. as casing net, stockinette and elastic net. The net is usually a seamless net stocking or a tube comprising meshes with polygonal, circular or oval forms, and comprises fibers selected from the group consisting of cotton, linen, viscose, polyamide, polyester, polyolefin, cellulose and elastomers. U.S. Pat. No. 4,883,677 discloses PVDC as a net material. The patterns and variations in string-type offered are marketed with names such as square or cube, diamond, smooth, rib, ripple, spiral or hex.

Often a net alone would not sufficiently hold the meat product in place, or the net would adhere to the meat product in such a way that the surface of the meat product is damaged when the net is peeled off, leading to unappealing appearance of the final product. Therefore, before stuffing or even during stuffing the meat product into the net, the meat product (such as a ham) is typically encased in a wrapping, which may be edible if made from collagen, modified cellulose or carrageenan, or inedible if made from fibrous or plastic casings, cellophane or paper. If the wrapping is only an unsealed film, the net prevents the film from being opened.

An example of a fiber-reinforced film for use with a net is disclosed in US 2010/0227164. Said film comprising a paper-reinforced alginate film containing polyhydric alcohol, is taught to provide elasticity, permeability and resistance properties, the film further having peelability without residues and offering after removal an optionally smoked food product with a clearly visible net-like pattern thereon. However, the usage of this film—as of any permeable wrapping—is accompanied by the above mentioned disadvantages of weight loss during cooking and storage without secondary packaging.

To provide a packaging system that allows to perform a stuffing process in a conventional stuffing machine, U.S. Pat. No. 7,666,484 discloses a film curved onto itself along a longitudinal axis to form a cylinder, in which the longitudinal side edges are overlapping to a certain extent in direct contact with each other but not otherwise connected, shirred or wrinkled in the manner of an accordion, that can have an internal support in the form of a tube of a stiff material, and which can be externally coated by a separation sheet and an also shirred tubular net. However, any usage of a combination of net and casing is expensive and therefore only applied for highly valued products. Another problem when developing a new meat item with a woven net casing (whether fixed or elastic netting) is the difficulty how to consistently obtain the required "net weight".

Regarding the combination of a net with a casing, WO 2007/090934 teaches the production of a composite shirred casing comprising the steps of pulling an outer casing over the inner casing, and optionally a net between the inner and outer casings, or over the outer casing, and finally shirring the composite casing so as to obtain a compact tube, which is cut to yield sticks. The outer casing may be formed of a multilayer plastic casing, while the inner casing may be a fibrous casing. Using two casings, further increases the costs of the netted product.

DE 3741329 discloses a sausage casing made at least partially of thermoplastic material, where the entire circumference of the casing shows outwardly bulging deformations, which may be spherical in shape and regularly spaced. Essential for the sausage casing described in DE 37 41 329 is that the casing is enclosed by an elastic net, whose meshes allow the deformations to penetrate when the casing is stuffed. By providing an elastic net on the outside of the casing, pressure is enacted on the casing so that formation of bubbles inside the sausage can be avoided. The deformations need to be embossed into the thermoplastic flat sheet, which then can e.g. be sewn together to form a tubular casing. An air-permeable embodiment is said to be suitable for dried sausages.

To avoid the usage of a net without losing the net-like appearance of the final product, EP 2 478 772 A discloses a casing which is a tube-shaped knitted stockinette made of a single type of yarn (e.g. polyester fibers), wherein the stockinette comprises zones of condensed stitches. The condensed stitches can adhere to each other by heat deformation, which in addition may shrink the zones of the condensed stitches. To obtain these zones, which have a reduced elasticity, the knitted stockinette is selectively heated by pressing the flattened knitted stockinette between two heated molds, each provided with a corresponding e.g. net-like pattern.

To obtain a simulated netted surface appearance without actually using a net and to retain the product juices within the cooked product, U.S. Pat. No. 5,597,606 suggests to form a cooking cavity of a heat shrinkable film, filling the cavity with meat product, closing the product-filled cavity with another heat shrinkable material, cooking the formed meat product package, and thereafter removing the package so that the three dimensional meat product surface is retained and the juices are contained within the finished product. In a subsequent step the product could then be e.g. smoked or colored, and finally resealed for sale. The mold, which forms the film into the cooking cavity, has a simulated net retaining surface interior. The interior topology of the mold shall be mirrored by the film, in which afterwards the meat emulsion is cooked, receiving the shape of the film. Main disadvantages of this process are the additional step for applying taste or color and the shape of the final product, which is not typical for the net application the final product shall resemble.

All of the above cited documents make use of permeable structures and/or flat films, which need to be sealed by using one or more than one casing and/or flat film, in order to produce a net-cooked meat product or a meat product having an appearance of having been net-cooked.

In order to transfer a functional additive like liquid smoke or caramel solutions onto foodstuff, several casing structures have been described. As inner layers of the casing, some of these structures use hydrophilic materials, which allow the absorbance of the functional additive into the material. For example inner layers comprising starch were used. Other structures use as an inner layer a layer made of cellulose which will come into contact with the foodstuff. In such a case, however, absorption of the liquid into the paper or cellulose is observed. In case of a flat film, alternatively the desired functional additive can be sprayed, printed or scraped onto the surface of the casing. In order to achieve a sufficient fixation, a drying step usually has to be carried out before the flat film is formed into a tube and sealed. Upon transfer of the functional additive onto the meat, the seal will be visible as a longitudinal line having a different color, in longitudinal direction of the peeled food product.

The carrier film of these structures can be a fibrous layer, the major disadvantage of which is a low water vapor barrier effect. During a cooking process or storage of the product, the foodstuff loses part of its water content, thus reducing the yield. For this reason plastic coated fibrous casings and laminates comprising an outer plastic film and an inner paper or cellulose film have been developed.

EP 0 992 194 A discloses a casing that consists of an impermeable film with a joined inner lining consisting of fibers made of cotton or cellulose, or woven, non-woven or knitted fabric, which is then impregnated and sealed to form a tube or bag.

Another example of a food casing which is capable of transferring food additives is described in US 2006/0003058 A, which teaches an at least two-layered tubular food casing comprising an inner layer formed of a thermoplastic organic polymer embedding a powdery organic filler such as starch. The casings described in these two documents combine the absorbance capacity of a material forming the inner layer and the barrier properties provided by the outer (multi-layer) plastic films. However, such casings are disadvantageous because a multi-step production process for preparing such coated or laminated casing structures is needed and/or a possible mold growth on the inner starch, cellulose or paper layer and breaking problems during cooking may occur.

U.S. Pat. No. 7,615,270 B2 discloses casings comprising an inner layer made of hydrophilic materials, such as e.g. block-copolyether ester or block-copolyether amide. Such casings suffer from the disadvantage that their absorbing capacity for liquid substances is limited. In many applications, such an absorbing capacity is insufficient in order to provide the desired effect onto the foodstuff. Furthermore, if liquid substance remains on the casing surface, a non-uniform, unpredictable distribution and formation of droplets upon opening of the tubular casing is likely and the transfer onto the foodstuff shows a marble-like, non-uniform coloration of the foodstuff.

DE 101 24 581 A teaches a food casing wherein liquid smoke is sprayed into the casing during shirring. As it takes a storage time of at least 5 days for the liquid smoke to migrate into the casing, the storage costs and the "time-to-customer" is high.

In general, the outer side of a casing is easily accessible for printing, coating and impregnation. But, in the case of tubular barrier films the casing needs to be turned inside out so that the treated surface will come into contact with the foodstuff. EP 1 192 864 A teaches a step of coating or impregnating the outer side of a casing which is stuffed into the bore of the strand so that it can be turned inside out during stuffing. Thus, prior to a stuffing of the strand, the treated outside surface of the casing can be contaminated during handling processes. Another drawback is that when the treatment (coating/impregnation) is carried out by using a printing process, the edges are printed twice, which leaves two longitudinal lines of higher intensity on the foodstuff after peeling off the casing.

The above described casings, which are capable of absorbing a high amount of transferable functional additive into the layer body by means of hydrophilic components or pores, intend to homogeneously transfer the contained functional additive to the enclosed foodstuff. They are not considered to transfer a pattern onto the foodstuff surface, or to generate a textured surface, or to produce a food product resembling the contact with a net during its production. Even if the to be transferred functional additive is printed in a pattern onto a flat film or onto the outside of a tubular casing, a textured surface of the final product is not obtained.

EP 0 738 471 A2 discloses a cellulose casing for stuffing meat products comprising a tubular body of indefinite length designed to receive the meat emulsion during the stuffing stage and to be eliminated after the subsequent smoking, cooking and/or coloring stage, characterized by being partially and continuously or discontinuously coated with a proofing substance providing a barrier to the passage of external smokes and/or colorings and/or pigments to define a color contrast on the surface of the meat product, once such smokes or colorings have been applied and after removal of the cellulose casing.

EP 1 955 596 A2 discloses a process of obtaining smoked food products with marks, characterized in that it comprises the following steps:
  printing proofing marks to water and smoke on the entire film or on a part thereof,
  coating the food product with at least the printed part of the film,
  intense drying of the food product and film at a relative moisture of less than 25%,
  smoking the food product and film under the same moisture conditions so as to obtain areas on the food product surface in correspondence with the position of the marks with a darker smoked color than that obtained on the rest of the surface.

Both EP 0 738 471 A2 and EP 1 955 596 A2 use a process of smoking the enclosed food product to generate an image on the surface of the food product. Therefore, the casings need to be water vapor permeable, which results in weight loss during the cooking step and the following storage.

Therefore, the object to be solved by the present invention is to provide a (co)extruded thermoplastic food casing having a high strength, homogenous shirring and de-shirring ability, and excellent capability of transferring food additives to the enclosed foodstuff, wherein said thermoplastic food casing has a textured surface which provides the enclosed food on its surface with a three-dimensional pattern wherein said (co)extruded thermoplastic food casing does not comprise a net on its outside surface.

Further, it is an object of the present invention to provide a process for preparing such an improved (co)extruded food casing.

Furthermore, an object of the present invention is the use of the casing as a wrapping for meat and other foodstuff products.

SUMMARY OF THE INVENTION

According to the invention, there is provided a functional additive transferring (co)extruded thermoplastic food casing having a water vapor barrier and/or oxygen barrier effect, said food casing comprising one or more layers, wherein an inside surface of said thermoplastic food casing has a textured surface which forms a three-dimensional pattern of higher and lower retaining capacity for a functional additive, wherein said thermoplastic food casing having a textured surface in case of a monolayer casing, or an inner layer of said thermoplastic food casing if said food casing comprises more than one layer, which inner layer forms the inside surface having a textured surface, comprises as a main component at least one thermoplastic polymer material selected from the group consisting of (co)polyamides, (co)polyolefins, (co)polyester and vinylidenchloride (co)polymers, wherein said (co)extruded thermoplastic food casing does not comprise a net and/or a material forming a net or any other three dimensional structure on its outside surface, wherein the average thickness of the thermoplastic food casing in the areas having a higher retaining capacity is in a range of from 1 to 100 µm, wherein the average thickness of the thermoplastic food casing in the areas having a lower retaining capacity is in a range of from 191 to 2000 µm, characterized in that the thickness difference between the average thickness in said areas having higher retaining capacity and the average thickness in said areas having a lower retaining capacity is in a range of from 160 to 1950 nm and in that a ratio of the average thickness of the thermoplastic food casing in the areas having a higher retaining capacity and the average thickness of the thermoplastic food casing in the areas having a lower retaining capacity is in a range of from 0.002 to 0.25.

Surprisingly, according to the present invention, the areas having the highest wall thickness form the areas having a lower retaining capacity, while the areas having the thinnest wall thickness form the areas having a higher retaining capacity. Furthermore, in contrast to the conventional use of nettings in combination with casings, the casing according to the present invention has the advantage that the net-topology cannot shift and become irregular, because the inside surface of the thermoplastic food casing actually forms the net-topology which is to be transferred onto the enclosed foodstuff.

According to the present invention it was surprisingly found that a retaining capacity for a functional additive such as liquid smoke in areas having an average wall thickness in a range of from 1 to 100 µm clearly differs from a retaining capacity for said functional additive in areas having an average wall thickness in a range of from 191 to 2000 µm, provided that the thickness difference between the average thickness in said areas having higher retaining capacity and the average thickness in said areas having a lower retaining capacity is in a range of from 160 to 1950 µm and that a ratio of the average thickness of the thermoplastic food casing in the areas having a higher retaining capacity and the average thickness of the thermoplastic food casing in the areas having a lower retaining capacity is in a range of from 0.002 to 0.25, so that these different areas of lower and higher retaining capacity will transfer different amounts of such a functional additive onto the enclosed foodstuff in said different areas. Furthermore, it was found that if the difference between the average wall thickness in said areas having a higher retaining capacity and the average wall thickness in said areas having a lower retaining capacity is in a range of from 160 to 1950 µm and a ratio of the average thickness of the thermoplastic food casing in the areas having a higher retaining capacity and the average thickness of the thermoplastic food casing in the areas having a lower retaining capacity is in a range of from 0.002 to 0.25, both areas will be able to transfer functional additive such as liquid smoke onto the enclosed foodstuff in such a way that—after transferring for example a colored functional additive—a visually verifiable contrast in the amount of functional additive being transferred can be achieved and at the same time the desired topology is noticeable and is not damaged during the stuffing or cooking process. If, however, the difference between the average wall thickness in said areas having a higher retaining capacity and the average wall thickness in said areas having a lower retaining capacity is outside a range of from 160 to 1950 µm and/or a ratio of the average thickness of the thermoplastic food casing in the areas having a higher retaining capacity and the average thickness of the thermoplastic food casing in the areas having a lower retaining capacity is outside a range of from 0.002 to 0.25, the amount of functional additive being transferred is either too small to let a pattern be visually detectable and/or the increasing inability of the areas of high retaining capacity to bulge out with increasing thickness does not support the formation of a textured topology. When the difference is smaller than 160 µm or the ratio is larger than 0.25, or—on the respective other side of the ranges—the large thickness differences carry the risk that micro-channels remaining in the cross-section, cannot be closed when closing the thermoplastic food casing for example by a clip and/or the areas of higher retaining capacity may be too thin in relation to the thickness of the areas of lower retaining capacity to securely survive a possibly necessary reversing step and a stuffing and/or cooking process.

The term "(co)extruded thermoplastic food casing" comprises tubular casings, which have been extruded by means of an annular die, and flat films or cut-open tubular casings, which may be sealed to become a tubular casing, and bags made thereof, The term includes extruded monolayer casings, coextruded multilayer casings and laminates thereof.

The term "having a water vapor barrier effect" according to the present invention means that the final (co)extruded thermoplastic food casing shows a water vapor transmission rate of 0.01 to 500 $g/m^2d$, preferably 0.1 to 100 $g/m^2d$, more preferably 1 to 20 $g/m^2d$, even more preferably 1 to 10 $g/m^2d$ at 23° C. and 85% relative humidity according to ASTM E398-03.

The term "having an oxygen barrier effect" according to the present invention means that the coextruded thermoplastic food casing shows an oxygen transmission rate through the food casing of the present invention of 30 cm$^3$/(m$^2$ d bar) or less, preferably of less than 20 cm$^3$/(m$^2$ d bar), often in the range of 6 to 12 cm$^3$/(m$^2$ d bar), sometimes of about 0.1 or about 1 to less than 6 cm$^3$/(m$^2$ d bar) when tested according to DIN 53380-3 at 23° C. and 50% relative humidity.

The term "comprising as a main component at least one thermoplastic polymer material" according to the present invention means that at least one thermoplastic polymer material selected from the group consisting of (co)polyamides, (co)polyolefins, (co)polyester and vinylidenechloride (co)polymers, is present in said (co)extruded thermoplastic food casing in case of a monolayer casing or said inner layer comprising the inside surface having a textured surface in case of a multilayer casing in a weight ratio of at least 55 weight-%, preferably at least 70 weight-%, more preferably at least 80 weight-%, even more preferably at least 90 weight-%, most preferably 90 to 95 weight-% based on the weight of the at least one layer of the (co)extruded thermoplastic food casing comprising the inside surface having a textured surface (but not including a functional additive).

In a preferred embodiment said (co)extruded thermoplastic food casing (in case of a monolayer casing) or the inner layer comprising the inside surface having a textured surface thereof (in case of a multilayer casing) comprises as a main component a (co)polyolefin and at least 5 weight-% of a (co)polyamide based on the weight of the thermoplastic food casing or the inner layer having a textured surface.

The term "textured surface" according to the present invention means a surface which forms a three-dimensional pattern of higher and lower retaining capacity for a functional additive, wherein the average thickness of the thermoplastic food casing in the areas having a higher retaining capacity is in a range of from 1 to 100 µm, wherein the average thickness of the thermoplastic food casing in the areas having a lower retaining capacity is in a range of from 191 to 2000 µm, provided that the thickness difference between the average thickness in said areas having higher retaining capacity and the average thickness in said areas having a lower retaining capacity is in a range of from 160 to 1950 µm and that a ratio of the average thickness of the thermoplastic food casing in the areas having a higher retaining capacity and the average thickness of the thermoplastic food casing in the areas having a lower retaining capacity is in a range of from 0.002 to 0.25.

According to the present invention the term "retaining capacity" is a parameter defining the weight of demineralized water or a functional additive, which can be held by the structure and topology of the casing on an area of its surface and includes any absorption and/or adsorption of demineralized water or a functional additive into and/or onto the inside surface of the (co)extruded thermoplastic food casing in case of a monolayer casing or an inside surface of an inner layer of said thermoplastic food casing if said food casing comprises more than one layer, which inner layer forms the inside surface having a textured surface, at room temperature (25° C.) and atmospheric pressure (1 bar). According to the present invention the (co)extruded thermoplastic food casing usually shows a retaining capacity of at least 30 g/m$^2$ of demineralized water of functional additive in the areas having a higher retaining capacity. The unit of the retaining capacity is g/m$^2$, where the mass of the demineralized water is given in g and the area is the extension of the measured sample in a plane (not the surface area of the topology). The method of determining the parameter "retaining capacity" of the casing according to the present invention is described below, wherein the weight of demineralized water entrapped between the inside surface of the flattened casing and a flat glass plate is measured. In case that the textured surface forms an inner side of a tubular casing, the method of determining the parameter "retaining capacity" is carried out after the casing has been cut open so as to prepare a flat casing wherein the textured inside surface is accessible.

According to the present invention the parameter "area having a lower retaining capacity" means an area in which the casing has its highest thickness. As shown in FIG. 1, in one embodiment the (co)extruded thermoplastic food casing (1) according to the present invention comprises on the food contact side (2) areas having a lower retaining capacity (3) and areas having a higher retaining capacity (4), wherein the areas having a lower retaining capacity have a higher wall thickness (5) and the areas having a higher retaining capacity have a lower wall thickness (6). As understood by a person skilled in the art, under gravity the functional additive may flow from those thick areas towards the thin areas of higher retaining capacity when the textured surface of the casing is facing upwards (when the casing for example is placed on a horizontal plane). Also, if the coating step is followed by a squeezing step, the areas of highest thickness will experience the highest pressure so that the functional additive is removed from the areas of lower retaining capacity. According to the present invention in order to determine the average thickness of an area having a lower retaining capacity, usually in a first step the area having a lower retaining capacity is defined by marking an area of highest thickness by means of carbon paper, which is attached to a flat glass plate.

Furthermore, according to the present invention the parameter "area having a higher retaining capacity" means an area of the inside surface of the casing which does not come in contact with a flat glass plate used for marking an area having a lower retaining capacity as explained above. In other words, such an area having a higher retaining capacity will be accessible for a food additive to be entrapped between the glass plate and the inside surface of the casing.

The term "a textured surface which forms a three-dimensional pattern of higher and lower retaining capacity for a functional additive" according to the present invention means any pattern to be transferred onto the surface of the enclosed food. In a preferred embodiment a net-like pattern is transferred onto the surface of the enclosed food. However, said textured surface may have a different design so that for example names, logos or designs representing a text, icon or other message can be transferred onto the surface of the enclosed food.

According to the present invention the average thickness of the thermoplastic food casing in an area of lower retaining capacity is determined in at least 5 locations which have been marked with the color of a carbon paper as outlined above, wherein said at least 5 locations are at least 4 cm apart from each other and not 4 of the 5 locations are on one line. According to the present invention the average thickness of the thermoplastic food casing can be determined for example by means of a thickness gauge, as described below. The average thickness of the thermoplastic food casing in an area of higher retaining capacity can be determined, as described below, by means of a thickness gauge, scanning with multiple measurements (at least 10 measurements) for the lowest wall thickness along the 10 connecting lines between the 5 locations, which were marked with the color of a carbon paper. In case that the areas of higher retaining capacity cannot be made accessible to the tip of the thickness gauge, the thickness of these areas can be determined on thin-sections under a light or optical microscope, wherein thin-sections of casings or films prepared with a (cryo-) microtome in the direction of the connecting lines are used. The measurements of the average wall thickness may also be performed under a scanning electron microscope (SEM) or on SEM photographs, e.g. with the aid of measurement lines counting measurement lengths for areas having a lower retaining capacity (highest wall thickness) and areas having a higher retaining capacity (lowest wall thickness), wherein the average wall thickness is determined by creating number-average values of at least 5 samples of areas having a lowest wall thickness and 10 samples of areas having a highest wall thickness within a total casing area of 10 cm$^2$.

The term "embossing" according to the present invention refers to a process step with which a wall thickness of specific areas of the inside surface of the thermoplastic food casing is reduced by applying a mechanical treatment to the surface of the thermoplastic food casing while being in a mostly thermoplastic state, where the polymers show viscous flow behavior. For this deformation, semi-crystalline polymers need to be at temperatures around its melting temperature or above.

The term "thermoforming" according to the present invention refers to a process step with which a wall thickness of specific areas of the thermoplastic food casing is reduced while said thermoplastic food casing is in a thermoelastic state. In order to achieve a wall thickness reduction the thermoplastic material of said thermoplastic food casing needs to be at temperatures above the glass transition temperature, but below the melting temperature.

The term "draw ratio" according to the present invention refers to the ratio of the surface area of a thermoformed area after thermoforming in relation to the surface area of the same area before thermoforming. If according to the present invention an "embossing" step is carried out, the draw ratio of the embossing step is equal to 1.

The terms "reversing" and "inverting" according to the present invention refer to a process of turning the casing inside out so that the outside surface becomes the inside or food contact surface of the casing after the reversing or inverting step.

In a preferred embodiment said (co)extruded thermoplastic food casing having a textured surface on the inside surface which forms a three-dimensional pattern of higher and lower retaining capacity for a functional additive, is a seamless (co)extruded thermoplastic food casing.

In a further preferred embodiment of said (co)extruded thermoplastic food casing having a textured surface on the inside surface which forms a three-dimensional pattern of higher and lower retaining capacity for a functional additive, the retaining capacity is at least 80 g of demineralized water per m$^2$ or more preferably at least 250 g of demineralized water per m$^2$.

In a further preferred embodiment of said (co)extruded thermoplastic food casing the thermoplastic food casing according to the present invention comprises not only areas of higher retaining capacity and areas of lower retaining capacity (i.e. a higher and a lower level), but further comprises areas of intermediate retaining capacity so as to create for example intermediate color shades on the food product enclosed such as a sausage. An intermediate retaining capacity may be formed for example by locally applying an intermediate embossing pressure which is higher than the embossing pressure in the areas of lower retaining capacity or by locally applying a higher stretching ratio in thermoformed areas of intermediate retaining capacity compared to the areas of lower retaining capacity.

The present invention further provides a method for producing a (co)extruded thermoplastic food casing as defined above, comprising a step of subjecting the (co) extruded casing to a mechanical and thermal treatment so as to create on its surface which will come into contact with the food product to be enclosed a textured surface providing a three-dimensional pattern of higher and lower retaining capacity for a functional additive.

In an alternative embodiment the present invention provides a method for producing a (co)extruded thermoplastic food casing as defined above, comprising a step of subjecting a (co)extruded tubular casing to at least one mechanical and thermal treatment so as to generate on its outside surface a textured surface providing a three-dimensional pattern of higher and lower retaining capacity for a functional additive and a subsequent reversing step of turning the casing inside out.

In a further alternative embodiment the present invention provides a method for producing a (co)extruded thermoplastic food casing as defined above, comprising a step of subjecting the (co)extruded casing to a mechanical and thermal treatment so as to generate on its outside surface a textured surface providing a three-dimensional pattern of higher and lower retaining capacity for a functional additive, a subsequent reversing step of turning the casing inside out, and a subsequent further step of subjecting the (co)extruded casing to a mechanical and thermal treatment so as to generate on its inside surface a textured surface providing an enhancement of the three-dimensional pattern of higher and lower retaining capacity for a functional additive.

A person skilled in the art is well aware of several different inverting techniques, including a technique of reversing a shirred stick during stuffing. The reversing becomes more difficult with increasing thickness of the areas with lower retaining capacity, with increasing modulus of the embossed material and with smaller flat width of the casing.

Impregnation of the inside surface of the (co)extruded thermoplastic food casing with a functional additive can be carried out by spraying or bathing the (co)extruded thermoplastic food casing while the food-contact-surface is still on the outside. In this case there is an option of drying and/or curing the functional additive to immobilize the functional additive on the surface before the (co)extruded thermoplastic food casing is reversed. Alternatively to carrying out coating a functional additive onto the outside surface of the (co)extruded thermoplastic food casing, the casing can be reversed after a mechanical and thermal treatment of the outside surface and thereafter be impregnated by using internal coating technologies like "moving bubble" or inside spraying e.g. during shirring.

The method for producing a (co)extruded thermoplastic food casing as defined above optionally further comprises a step of subjecting the (co)extruded thermoplastic food casing to a mono-axial or bi-axial orientation treatment prior to forming a textured surface on the inside or outside surface of the food casing. By subjecting said (co)extruded thermoplastic food casing to a mono-axial or bi-axial orientation treatment, e.g. in a double- or triple-bubble process, the strength of the casing structure can be further increased so that wrinkle-free and caliber consistent food casings can be produced. Preferably the oriented casing should have low or no shrinkage in order to avoid shrinking in subsequent thermal treatment steps, like e.g. drying of an outside coating. This is especially important when an embossing step is to follow the orientation step, because released shrinkage will cause the film or tubular casing to wrinkle, which makes it difficult to handle the casing in subsequent steps. For example, the precise positioning of the embossed casing in a thermoforming tool is difficult if the casing was allowed to shrink during embossing. A mono-axial or bi-axial orientation treatment reduces the capability of the casing to be deformed by additional mechanical and thermal treatment so that a low orientation degree is most preferred before subjecting the (co)extruded thermoplastic food casing to an additional mechanical and thermal treatment.

Furthermore, in a preferred embodiment of the present invention the polymer composition which will form the food-contact layer of the (co)extruded thermoplastic food casing is a polymer composition comprising in addition to the at least one thermoplastic polymer at least one hydrophilic component and optionally a filler.

As according to the present invention the casing is a thermoplastic food casing, disadvantages due to lamination with organic substances can be avoided and, thus, mold growth risks due to organic substances such as paper, cellulose or starch will be excluded. In case that the casing is seamless, furthermore, in view of the production process used according to the present invention, a tubular (co)extruded thermoplastic food casing can be produced which does not comprise any weakening seam or seal so that a continuous retaining capacity pattern can be formed.

According to the present invention it was surprisingly found that by subjecting the (co)extruded thermoplastic food casing to a mechanical and thermal treatment as described herein, on the treated side a textured surface forming a three-dimensional pattern of different retaining capacities for a functional additive can be formed. When subjecting the (co)extruded thermoplastic food casing to such a mechanical and thermal treatment the wall thickness of the (co)extruded thermoplastic food casing will be decreased at locations where a higher retaining capacity is formed, and will be increased at locations where a lower retaining capacity is formed. This is contrary to what one would commonly have in mind. Furthermore, it was surprisingly found that by subjecting the (co)extruded thermoplastic food casing to a mechanical and thermal treatment as described herein, so that the average thickness of the thermoplastic food casing in the areas having a higher retaining capacity is in a range of from 1 to 100 µm, the average thickness of the thermoplastic food casing in the areas having a lower retaining capacity is in a range of from 191 to 2000 µm, provided that the thickness difference between said areas having higher retaining capacity and said areas having a lower retaining capacity is in a range of from 160 to 1950 µm and that a ratio of the average thickness of the thermoplastic food casing in the areas having a higher retaining capacity and the average thickness of the thermoplastic food casing in the areas having a lower retaining capacity is in a range of from 0.002 to 0.25.

In a preferred embodiment the thickness difference between said areas having a higher retaining capacity and said areas having a lower retaining capacity is 160 µm to 1950 µm, preferably 250 µm to 1500 µm, more preferably 300 µm to 1000 µm, even more preferably 400 µm to 900 µm, more preferably 400 µm to 800 µm, most preferably 500 µm to 800 µm, the strength of said (co)extruded thermoplastic food casing can be maintained at the same level as a (co)extruded thermoplastic food casing not subjected to any mechanical and thermal treatment as described herein.

Furthermore, in a preferred embodiment the ratio of the average thickness of the thermoplastic food casing in the areas having a higher retaining capacity and the average thickness of the thermoplastic food casing in the areas having a lower retaining capacity is in a range of from 0.001 to 0.25, more preferably 0.005 to 0.25, even more preferably 0.01 to 0.20, even more preferably 0.02 to 0.15, most preferably 0.04 to 0.10.

Contrary to the food casings known in the art, the retaining capacity of the food casing according to the present invention depends on the location on the surface of the casing (i.e., on the areas of higher and lower retaining capacity) so that a pattern is transferred onto the foodstuff.

Furthermore, a water vapor and/or oxygen barrier effect of the (co)extruded thermoplastic food casing can be adjusted by adjusting the composition forming the at least one layer of the (co)extruded thermoplastic food casing having a water vapor and/or oxygen barrier effect. The food casing according to the present invention assures a sufficient barrier effect so that the to-be-transferred functional additives do not readily diffuse to the outside of the casing, preventing contamination of the environment and machinery during handling and processing. Furthermore, by using a food casing according to the present invention weight loss during cooking and storage can be greatly decreased in comparison to conventional casings made of fibrous, cellulose or collagen.

Furthermore, for example, blends of polyamide and polyethylene vinyl alcohol or polyamide resins having a barrier effect for oxygen such as polyamide resins produced through polycondensation of meta-xylylene diamine (MXDA) with adipic acid (e.g. Nylon-MXD6® from Mitsubishi Gas Chemical Company) can be used.

BRIEF DESCRIPTION OF THE FIGURE

FIG. 1 represents a preferred embodiment of a food casing (1) according to the present invention comprising on the food contact side (2) areas having a lower retaining capacity (3) and areas having a higher retaining capacity (4), wherein the areas having a lower retaining capacity have a higher wall thickness (5) and the areas having a higher retaining capacity have a lower wall thickness (6).

DETAILED DESCRIPTION

A food casing according to the invention may be used as a packaging for any type of food including but not limited to meat products, sausage products, milk products, cheese products and dishes, unprocessed or processed—especially to meat containing products like fermented sausages, cooked-meat sausage (Kochwurst), scalded emulsion sausage (Brühwurst) like frankfurters, cooked ham (Kochschinken), ham, pickled meat, smoked turkey breast and salt meat (Pökelware), vegetables, dairy products like cheese, carbohydrates, soybean products as well as different mixtures or in any desired application. The food casings according to the present invention may be used in any desired form such as in the form of "endless" tubes, sections, customized products such as shirred sticks or bags, and the food casing according to the present invention can be empty, stuffed and further processed if desired.

Food is often processed, i.e. cooked in a plastic film package, for example by at least partially immersing the package in hot water or placing the package in a steam cabinet. The processed food package may then be refrigerated until the processed food is prepared for a meal or is to be consumed, or it is peeled and further packaged after portioning into pieces or slices. During the cooking process e.g. of meat, for example, smoke or other modifiers for color, flavor or fragrance diffuse into the food material. The diffusion process takes longer if taking place at ambient temperatures only, e.g. during a fermenting process or storage.

Transferable Functional Additives

The at least one transferable functional additive may be, for example one or more of colorants such as caramel or paprika extract, flavorants such as glutamates, fragrances such as terpenoids and/or any other desired food additives. Many transferable functional additives can be effective as different (such as two or three) types of transferable functional additives selected from the group of types colorants, flavorants and fragrances. For example liquid smoke functions as a colorant, a flavorant as well as a fragrance.

A colorant, flavorant, fragrance and/or any other additive or any combination thereof may be applied—in one of the possible embodiments—to the casing in any desired way e.g. in a tube containing the liquid, dispersed, dissolved or in any combination. The transferable functional additive can be in a liquid mass which may preferably be distributed with the aid of a liquid bubble such that the additive may be moved or distributed or both. In such a way, the content of the transferable functional additive may be directly applied to a (co)extruded and optionally stretched casing. The transferable functional additive may be applied in its commercially available condition—preferably in a liquid form, especially in a dissolved form, dispersed form or in a dissolved and dispersed form, e.g. in water—or in a modified condition. More preferred, the functional additive is present in dissolved form in water. It is typically applied onto the food-contact surface of the casing, e.g. by dipping, flooding, spraying or even by squeezing of the tube containing the liquid mass. This can be effected e.g. with the aid of squeezing rollers and distributing the liquid at least partially on the inside surface of the casing e.g. with the aid of such squeezing rollers. Preferably at least one of these compounds or a mixture containing at least one of these compounds—preferably in a liquid form—may be absorbed, charged, distributed, incorporated, injected, applied as a film or coating or in any combination thereof onto/in/into a film or food contact surface of the casing. The transfer of these compounds/mixtures from the food contact surfaces of the food casing to the food may occur via their interface. This is particularly the case if the (co)extruded thermoplastic food casing is formed of non-polar polymers such as polyolefins. If the colorant, the flavorant, the fragrance and/or any other additive is polar in nature, the transmission of such compound(s) may sometimes be nearly complete or perhaps even complete, if the non-polar surface had been coated with the polar functional additive.

Furthermore, the application of the at least one transferable functional additive can also take place via a printing process. Also, if there are two or more transferable functional additives, they can be applied independently of one another, so that different patterns and/or tastes can be achieved. For example, spices can be applied only along one section of the circumference of the casing, but in principle covering any portion of the entire circumference. The adhesion of the functional additive to the casings surface can be increased by applying a plasma or corona treatment to the casings surface prior to coating the casing with the functional additive, in the case of a particulate functional additive, such as spices or herbs, by the use of adequate binders.

Preferably, this corona discharge treatment is conducted in such a way that after an optional corona discharge treatment the wetting tension of the innermost layer surface is 35 mN/m or higher, preferably 40 mN/m or higher, and more preferably 50 to 60 mN/m, as measured by testing inks according to DIN ISO 8296 for the determination of the wetting tension of plastic films. The conditions of the corona discharge are not limited and may be suitably determined according to the type, thickness and feeding rate of the casing to be processed.

The (Co)Extruded Thermoplastic Food Casing

The (co)extruded thermoplastic food casing claimed according to the present invention has a water vapor barrier effect. In one embodiment, the (co)extruded thermoplastic food casing is designed to absorb/adsorb and therefore to immobilize the at least one transferable functional additive on the inside surface thereof, wherein the term "immobilizing" means that the at least one transferable functional additive is fixed during the time period between coating and desorption of the functional additive for transferring it onto the foodstuff. The additive can be in liquid form and after it is immobilized, it can be desorbed, mobilized and transferred to food it is in contact with. The additive usually is adsorbed/absorbed to or bonded by the inside surface of the casing. The immobilization is enhanced by plasma or corona treating the casing surface and/or by drying and/or curing of the functional additive after coating the casing.

The (co)extruded thermoplastic food casing according to this invention can be a flat film, which is sealed to a tube latest at the point of stuffing, a sealed flat film or a seamless tubular casing, and it can be a mono- or a multilayer casing or a laminate thereof. Multilayer casings usually comprise at least 2 layers, but can comprise 10 or more layers. Many different multilayer structures are possible. More preferred, a casing according to the invention comprises two, three, four, five or seven layers, even more preferred are three, five or seven layers.

Especially when the food casing is tubular and the food contact surface on the outside shall be deformed by embossing, a multilayer casing is preferred, because the risk of sealing the inside surfaces of the tubular casing together in an embossing and/or a thermoforming step can be reduced or even avoided by selecting thermoplastic materials for the inside surface layer which have a sufficiently higher melting temperature than the embossing and the thermoforming temperature of the food contact layer. The difference between the melting temperature of the material of the inside surface and the melting temperature of the outside food contact surface, with the melting temperatures being measured according to DIN EN ISO 11357-3, should be larger than 30° C., preferably larger than 40° C., more preferably larger than 50° C., most preferably more than 60° C.

Possible structures of the monolayer or multi-layered (co)extruded thermoplastic food casings to be stuffed comprise the following layers from inner food contact layer to outer layer (which is at the time of embossing the inner layer in case of a tubular casing):

1. A layer of a polyamide (as flat film);
2. A layer of a polypropylene (as flat film);
3. Layers of polyamide/(modified polyolefin/) polyester
4. Layers of lower melt temperature polyamide/higher melt temperature polyamide;
5. Layers of modified polyethylene/polyamide
6. Layers of polyethylene/modified polyethylene/polyamide;
7. Layers of polyethylene/(modified polyethylene/) polyethylene/modified polyethylene/polyamide; and
8. Layers of polyethylene/modified polyethylene/polyamide/EVOH/polyamide.

More preferably possible structures of the monolayer or multi-layered (co)extruded thermoplastic food casings to be stuffed comprise the following layers:

1. A layer of PA6/66 (as flat film);
2. Layers of low melt temperature PA6/12/(grafted PE/) PA6;
3. Layers of low melt temperature PA6/69/(grafted PE/) PA6
4. Layers of PA12/(grafted PE/) PA 6
5. Layers of grafted PE/PA6
6. Layers of LLDPE/grafted PE/PA6;
7. Layers of LDPE/grafted PE/PA6/66
8. Layers of LDPE/(grafted PE/) LDPE/grafted PE/PA6
9. Layers of LLDPE/grafted PE/PA6/EVOH/PA6.

Numerous multi-layered structures can be produced in a manner well known to a person skilled in the art in accordance with the desired meat adhesion, oxygen transmission and water vapor transmission, mechanical properties and optical properties to be achieved. Each layer can also be composed of blends of different polymers.

The at least one layer of the (co)extruded thermoplastic food casing having a textured surface which forms a three-dimensional pattern of higher and lower retaining capacity for a functional additive comprises as a main component at least one thermoplastic polymer material selected from the group consisting of (co)polyamides, (co)polyolefins, (co)polyester and vinylidenechloride (co)polymers.

Thermoplastic polymer components within the meaning of this invention include organic polymers having an essential content of thermoplastic organic polymers. Typically such thermoplastic organic polymers have a transition region of flowing above the temperature of their use and below their melting temperature—especially for at least partially crystalline organic polymers. In many embodiments, the at least one layer of the (co)extruded thermoplastic food casing contains more than one typically thermoplastic organic polymer component. Often there are two or three, and sometimes even more than three different thermoplastic polymers or even at least two different thermoplastic polymers which differ in at least one chemical group contained therein.

The at least one thermoplastic polymer material selected from the group consisting of (co)polyamides, (co)polyolefins, (co)polyester and vinylidenchloride (co)polymers is selected from the following materials:
(Co-)Polyamides as described below, such as homo-, co- or ter-polyamides, preferably aliphatic (co-)polyamides, partially aromatic (co-)polyamides and polyether-block-amides;
polyolefins, preferably polyethylenes, polypropylenes or copolymers based on e.g. ethylene, propylene, or other -olefins, poly(iso)butene or any mixture thereof, or modified polyolefins as described below;
aliphatic or semi-aromatic (co)polyester as described below, preferably polyether esters, polyhydroxyalkanoates or polylactic acids; and
vinylidenechloride (co-)polymers (PVDC), e.g. copolymers of vinylidene chloride with comonomer(s) such as vinyl chloride or (meth)acrylate.

Furthermore, at least one layer of the thermoplastic food casing can further comprise one or more of the following materials: vinyl copolymers like ethylene vinyl acetate copolymers, polyvinyl alcohols, ethylene vinyl alcohol copolymers (EVOH) or any combination thereof, which optionally is partially or totally saponified, such as ethylene vinyl alcohol copolymers; polyvinylpyrrolidone (PVP), polyvinylpolypyrrolidone (PVPP), polystyrene, polyvinylchloride, polyvinylfluoride or any combination thereof; and (co-)polyesters of aliphatic, (partially) aromatic or aliphatic and aromatic character e.g. polylactide, polycaprolactone, polycarbonate or (co-)polymers of aliphatic diols with aliphatic or aromatic dicarboxylic acid(s) such as terephthalate(s), such as poly(butylenes glycol terephthalate).

The term "comprising as a main component at least one thermoplastic polymer material" according to the present invention means that at least one thermoplastic polymer material selected from the group consisting of (co)polyamides, (co)polyolefins, (co)polyester and vinylidenechloride (co)polymers, is present in said (co)extruded thermoplastic food casing in case of a monolayer casing or said inner layer comprising the inside surface having a textured surface in case of a multilayer casing in a weight ratio of at least 55 weight-%, preferably at least 70 weight-%, more preferably at least 80 weight-%, even more preferably at least 90 weight-%, most preferably 90 to 95 weight-% based on the weight of the at least one layer of the (co)extruded thermoplastic food casing comprising the inside surface having a textured surface (but not including a functional additive).

In a preferred embodiment said (co)extruded thermoplastic food casing (in case of a monolayer casing) or the inner layer comprising the inside surface having a textured surface thereof (in case of a multilayer casing) comprises as a main component a (co)polyolefin and at least 5 weight-% of a (co)polyamide based on the weight of the thermoplastic food casing or the inner layer having a textured surface.

In a preferred embodiment as the thermoplastic polymer materials based on (co)polyolefins there are used copolymers of ethylene or propylene, more preferably linear alpha-olefins with 3 to 8 C-atoms with alpha-beta-unsaturated carboxylic acids, more preferably acrylic acid, methacrylic acid and/or their metal salts and/or their alkylester or corresponding graft-copolymers of the above-mentioned monomers onto polyolefins or partially saponified ethylene/vinylacetate-copolymers, which are optionally graft-polymerized with an alpha-beta-unsaturated carboxylic acid and have a low degree of saponification, or their blends. Furthermore, modified polyolefins such as modified homo- or copolymers of ethylene and/or propylene and optionally further alpha-olefins with 3 to 8 C-atoms, which contain grafted monomers such as alpha-beta-unsaturated dicarboxylic acids, preferably maleic acid, fumaric acid, itaconic acid or their acidic anhydrides, acid esters, acid amides or acid imides can be used according to the present invention. Most preferred are polyolefins which contain grafted maleic anhydride, because grafted maleic anhydride groups provide an adhesive function so that delamination of e.g. polyamide-based and polyolefin-based layers can be avoided.

In another preferred embodiment of the present invention polyolefins can be used as thermoplastic polymer materials, such as homopolymers of ethylene or propylene and/or copolymers of linear alpha-olefins with 2 to 8 C-atoms, preferably linear low density polyethylene, low density polyethylene, high density polyethylene, homo-polypropylene, block-polypropylene and random copolymers of propylene. In an even more preferred embodiment low density and linear low density polyethylene can be used.

In an even more preferred embodiment of the present invention in at least one layer of the (co)extruded casing polyamides are used as a main component of the thermoplastic polymer materials, such as for example homo-, co- or ter-polyamides which can be produced from the corresponding monomers such as caprolactam, laurolactam, omega-aminoundecan acid, adipic acid, azelaic acid, sebacic acid, decandicarbonic acid, dodecandicarbonic acid, terephthalic acid, isophthalic acid, tetramethylendiamine, pentamethylendiamine, hexamethylendiamine, octamethylendiamine and xylylendiamine. Preferred polyamides to be used according to the present invention are homo- and co-polyamides such as polyamide 6, polyamide 12, polyamide 66, polyamide 610, polyamide 612, polyamide MXD6, polyamide 6/66, polyamide 66/6, polyamide 6/12 and polyamide 6I/6T. In an even more preferred embodiment polyamide 66, polyamide 6 and polyamide 6/66 can be used.

Furthermore, the thermoplastic organic polymers to be used according to the present invention may comprise additional hydrophilic components such as a polyetherester copolymer, polyvinylalcohol, polyesterblockamide, copolyetheresteramide, block copolymer polyether amide, polyvinylpyrrolidone (PVP), polyvinylpolypyrrolidone (PVPP), cellulose esters, starch and/or starch esters so as to facilitate the water vapor transmission through the matrix of the at least one layer of the (co)extruded thermoplastic food casing. Such hydrophilic components may be used to adjust the water vapor transmission rate of the food casing to the needs of the application and/or to increase the absorption of the at least one transferable functional additive, which is desorbed for transfer onto the foodstuff when being cooked.

The thermoplastic food casing which has a textured surface which forms a three-dimensional pattern of higher and lower retaining capacity for a functional additive (in case of a monolayer casing) or the layer which has a textured surface which forms a three-dimensional pattern of higher and lower retaining capacity for a functional additive (in case of a multilayer casing) usually has an average wall thickness in the thin areas (providing a higher retaining capacity for a functional additive) of 1 to 100 nm, preferably 5 to 80 μm, more preferably 10 to 60 μm and an average wall thickness in the thick areas (providing a lower retaining capacity for a functional additive) of 191 to 2000 μm, preferably 250 to 1500 μm, more preferably 300 to 1000 μm. Furthermore, the thickness difference between said areas having higher retaining capacity and said areas having a lower retaining capacity is in a range of from 160 to 1950 μm, and a ratio of the average thickness of the thermoplastic food casing in the areas having a higher retaining capacity and the average thickness of the thermoplastic food casing in the areas having a lower retaining capacity is in a range of from 0.002 to 0.25.

According to the present invention it was surprisingly found that a retaining capacity for a functional additive such as liquid smoke in areas having an average wall thickness in a range of from 1 to 100 μm clearly differs from a retaining capacity for said functional additive in areas having an average wall thickness in a range of from 191 to 2000 μm, provided that the thickness difference between the average thickness in said areas having higher retaining capacity and the average thickness in said areas having a lower retaining capacity is in a range of from 160 to 1950 μm and that a ratio of the average thickness of the thermoplastic food casing in the areas having a higher retaining capacity and the average thickness of the thermoplastic food casing in the areas having a lower retaining capacity is in a range of from 0.002 to 0.25, so that these different areas of lower and higher retaining capacity will transfer different amounts of such a functional additive onto the enclosed foodstuff in said different areas. Furthermore, it was found that if the difference between the average wall thickness in said areas having a lower retaining capacity and the average wall thickness in said areas having a higher retaining capacity is in a range of from 160 to 1950 μm and a ratio of the average thickness of the thermoplastic food casing in the areas having a higher retaining capacity and the average thickness of the thermoplastic food casing in the areas having a lower retaining capacity is in a range of from 0.002 to 0.25, both areas will be able to transfer functional additive such as liquid smoke onto the enclosed foodstuff in such a way that—a colored functional additive provided—a visually verifiable contrast in the amount of functional additive being transferred can be achieved and at the same time the desired topology is noticeable and is not damaged during the stuffing or cooking process. If, however, the difference between the average wall thickness in said areas having a lower retaining capacity and the average wall thickness in said areas having a higher retaining capacity is outside a range of from 160 to 1950 μm and/or a ratio of the average thickness of the thermoplastic food casing in the areas having a higher retaining capacity and the average thickness of the thermoplastic food casing in the areas having a lower retaining capacity is outside a range of from 0.002 to 0.25, the amount of functional additive being transferred is either too small to let a pattern be visually detectable and/or the increasing inability of the areas of high retaining capacity to bulge out with increasing thickness does not support the formation of a textured topology. When the difference is smaller than 160 μm or the ratio is larger than 0.25, or—on the respective other side of the ranges—the large thickness differences carry the risk that micro-channels remaining in the cross-section, cannot be closed when closing the thermoplastic food casing for example by a clip and/or the areas of higher retaining capacity may be too thin in relation to the thickness of the areas of lower retaining capacity to securely survive a possibly necessary reversing step and a stuffing and/or cooking process.

In a preferred embodiment the thickness difference between said areas having higher retaining capacity and said areas having a lower retaining capacity is 160 μm to 1950 μm, preferably 250 μm to 1500 μm, more preferably 300 μm to 1000 μm, even more preferably 400 μm to 900 μm, more preferably 400 μm to 800 μm, most preferably 500 μm to 800 μm, the strength of said (co)extruded thermoplastic food casing can be maintained at the same level as a (co)extruded thermoplastic food casing not subjected to any mechanical and thermal treatment as described herein.

Furthermore, in a preferred embodiment the ratio of the average thickness of the thermoplastic food casing in the areas having a higher retaining capacity and the average thickness of the thermoplastic food casing in the areas having a lower retaining capacity is in a range of from 0.002 to 0.25, more preferably 0.005 to 0.225, even more preferably 0.01 to 0.20, even more preferably 0.02 to 0.15, most preferably 0.04 to 0.10.

In general the layer thicknesses also depend on the desired texturization of the final product.

Optionally the (co)extruded thermoplastic food casing may comprise fillers, hydrophilic substances supporting the absorption, nucleating agents, compatibilizers, and other additives.

According to the present invention when the functional additive absorbed/adsorbed in the (co)extruded thermoplastic food casing comes in direct contact with the food when food is encased in the casing, the at least one functional additive is transferred to the food.

As outlined above, the (co)extruded thermoplastic food casing has a barrier effect for water vapor, as the (co)extruded thermoplastic food casing is predominantly made of a thermoplastic polymer as defined above. A food casing having a sufficient barrier effect for water vapor in order to prevent that significant migration of transferable functional additive to the outside or significant weight loss during cooking takes place, shows a water vapor transmission rate of 0.01 to 500 g/m²d, preferably 0.1 to 100 g/m²d, more preferably 1 to 20 g/m²d, even more preferably 1 to 10 g/m²d at 23° C. and 85% relative humidity according to ASTM E398-03. If the food casing according to the invention shows a water vapor transmission of 20 g/m²d or less, then the encased foodstuff does not easily lose its moisture and the encased meat products stay fresh for extended time periods.

Said thermoplastic polymers to be used for the at least one layer of the (co)extruded thermoplastic food casing having a barrier effect for water vapor are typically the same thermoplastic polymers as those mentioned above. In a preferred embodiment said thermoplastic polymers to be used are selected from the group consisting of polyolefins, copolymers comprising ethylene and/or propylene and/or linear alpha-olefins with 3 to 8 C-atoms, copolymers to be used for an optional adhesive layer as described below, polyamides (homo-, co- or ter-polyamides), thermoplastics having an oxygen barrier effect and (co)polyesters. Mixtures of these thermoplastic polymers can be used as well. Where necessary, compatibilizers known to a person skilled in the art can be added to the thermoplastic polymer. Compatibilizers can for example be selected from the group consisting of copolymers of ethylene and vinyl acetate (EVA), ethylene and acrylic acid (EAA), ethylene and methacrylic acid (EMAA), ethylene and methyl acrylate (EMA), ionomers and/or anhydride modified polyolefins.

In a preferred embodiment the at least one thermoplastic polymer material forming the main component of the at least one layer of the (co)extruded thermoplastic food casing having a barrier effect for water vapor predominantly comprises organic polymers based on polyethylene, polypropylene, polybutylene, copolymers containing units of ethylene, of propylene, of α-olefin preferably with 4 to 8 carbon atoms, of dienes and/or any combination of these units or any combination of such organic polymers. Even functionalized vinyl monomers like vinyl acetate, (meth)acrylic acid and (meth)acrylic acid ester may be possible co-units for the copolymers. The more preferred copolymers are those comprising C2/C3 or C2/C8 polyolefin copolymers or a combination of these.

Furthermore, the (co)extruded thermoplastic food casing may additionally contain a dye, a fine-grained pigment or both which may be used for the coloring and/or for the UV protection of such casings. Also slip and/or anti-blocking additives may be added, if the layer is a surface layer.

If the (co)extruded thermoplastic food casing should have an oxygen barrier effect said food casing usually is a good barrier for oxygen or other gases or both and shows preferably an oxygen gas transmission rate through the food casing of the present invention of 30 cm³/(m² d bar) or less, preferably of less than 20 cm³/(m² d bar), often in the range of 6 to 12 cm³/(m² d bar), sometimes of about 0.1 or about 1 to less than 6 cm3/(m² d bar) when tested according to DIN 53380-3 at 23° C. and 50% relative humidity.

Suitable plastic materials for forming the at least one layer of such food casings include ethylene vinyl alcohol copolymers (EVOH), which may optionally be partially or totally saponified, or vinylidene chloride copolymers (PVDC), for example with vinyl chloride or (meth)acrylate as comonomers or a mixture of these. These polymers may be admixed with additives, such as softeners or other organic polymers, e.g. copolyamides and/or ionomers. Therefore, the compositions for the manufacture of the at least one layer of a food casing having an oxygen barrier effect as well as the composition providing such an oxygen barrier effect may consist essentially of the above mentioned components, if desired.

Textured Structure Providing a Three-Dimensional Pattern

According to the present invention the food contact surface of said thermoplastic food casing having a textured surface forms a three-dimensional pattern of higher and lower retaining capacity for a functional additive, wherein the retaining capacity usually is at least 30 g of demineralized water per m².

According to the present invention a textured surface which forms a three-dimensional pattern of higher and lower retaining capacity for a functional additive can transfer any pattern onto the surface of the enclosed food. In a preferred embodiment a net-like pattern is transferred onto the surface of the enclosed food. However, said textured surface may have a different design so that for example names, logos or designs representing a text, icon or other message can be transferred onto the surface of the enclosed food.

Due to the presence of such a textured surface on the food contact surface of the (co)extruded thermoplastic food casing, said thermoplastic food casing provides the food—when enclosed into said food casing—with a three-dimensional pattern on the surface of the enclosed food.

According to the present invention such a three-dimensional pattern can be formed on the surface of the enclosed foods, although said (co)extruded thermoplastic food casing does not comprise a net and/or a material forming a net on its outside surface.

Usually the (co)extruded thermoplastic food casing has an average wall thickness in the thin areas (providing a higher retaining capacity for a functional additive) of 1 to 100 μm, preferably 5 to 80 μm, more preferably 10 to 60 μm and an average wall thickness in the thick areas (providing a lower retaining capacity for a functional additive) of 191 to 2000 μm, preferably 250 to 1500 μm, more preferably 300 to 1000 μm. In general, thus a three-dimensional (according to the difference between thin and thick areas) textured surface topology is formed wherein the wall thickness is the base for achieving the desired topology of the final foodstuff product. The topology of the final foodstuff product does not only have to mirror the thickness differences of the casing, being limited by this difference. A thermoforming step may give additional depth to the topology of the casing and thus to the final product. Surprisingly it was found that by carrying out an embossing step the stuffing pressure may be strong enough to bulge out the casing in the areas of higher retaining capacity, if the thickness of the casing in these areas of higher retaining capacity is sufficiently low.

The wall thickness differences of the thermoplastic food casing, which has a textured surface which forms a three-dimensional pattern of higher and lower retaining capacity for a functional additive (in case of a monolayer casing) or the layer which has a textured surface which forms a three-dimensional pattern of higher and lower retaining capacity for a functional additive (in case of a multilayer casing), between said areas having a higher retaining capacity and said areas having a lower retaining capacity is in a range of from 160 to 1950 μm and a ratio of the average thickness of the thermoplastic food casing in the areas having a higher retaining capacity and the average thickness of the thermoplastic food casing in the areas having a lower retaining capacity is in a range of from 0.002 to 0.25.

In a preferred embodiment the thickness difference between said areas having a higher retaining capacity and said areas having a lower retaining capacity is 160 μm to 1950 μm, preferably 250 μm to 1500 μm, more preferably 300 µm to 1000 µm, even more preferably 400 µm to 900 µm, more preferably 400 µm to 800 µm, most preferably 500 µm to 800 µm, the strength of said (co)extruded thermoplastic food casing can be maintained at the same level as a (co)extruded thermoplastic food casing not subjected to any mechanical and thermal treatment as described herein.

Furthermore, in a preferred embodiment the ratio of the average thickness of the thermoplastic food casing in the areas having a higher retaining capacity and the average thickness of the thermoplastic food casing in the areas having a lower retaining capacity is in a range of from 0.002 to 0.25, more preferably 0.005 to 0.225, even more preferably 0.01 to 0.20, even more preferably 0.02 to 0.15, most preferably 0.04 to 0.10.

According to the present invention for example a net-like textured structure can be formed on the inside surface of a (co)extruded thermoplastic food casing by deforming the food-contact surface (which can be the outside surface, if the food casing is reversed after formation of the textured structure on the outside surface) of the (co)extruded thermoplastic food casing, thus increasing the retaining capacity of the food-contact surface of the food casing at locations of the thermoplastic food casing where the wall thickness of the food casing remains lower. The net-like color pattern formed for example on the enclosed food results from a higher amount of transferred functional additive which had been retained in the created topology.

Modifying the food contact surface of the (co)extruded tubular thermoplastic food casing can be achieved for example by embossing the outside surface of the food casing before reversing and/or by subjecting the (co)extruded thermoplastic food casing to a thermoforming process.

In an alternative embodiment the food-contact surface of the (co)extruded thermoplastic food casing after its thermoforming is uniformly coated (e.g. by spraying) with a functional additive and thereafter subjected to a shrinkage treatment (e.g. in a drying/annealing tunnel) so as to form areas wherein a higher amount of transferable functional additive per area unit is present than in non-shrunk areas.

In order to form a three-dimensional pattern of higher and lower retaining capacity for a functional additive, the retaining capacity of the food casing shall be locally (in the thin wall thickness areas) increased (changed), so that the casing has a retaining capacity of at least 30 g of demineralized water per $m^2$, preferably of at least 80 g of demineralized water per $m^2$, most preferably of at least 250 g of demineralized water per $m^2$.

An embossing treatment may include continuous methods using (optionally heated) cylinders or nip reels having for example a net-like surface as well as discontinuous methods such as hot-stamping by e.g. (optionally heated) stamping plates. Embossing takes place onto a flat film against a non-patterned background or onto both sides simultaneously in the collapsed state of a tubular casing. The embossing treatment results in a squeezing of polymeric material from locations of the square-shaped holes of the netting pattern to locations of the half-pipe-shaped yarn pattern. Usually, the (co)extruded food casing is pre-heated to a temperature, in which the thermoplastic polymer of the matrix of the at least one to-be-embossed layer is close to its thermoplastic state or even—especially if multi-layered—in the thermoplastic state, and is passed through a pair of (optionally heated) rollers or plates having an engraved image on the surface thereof corresponding for example to a net-like pattern. To use heated embossing tools has the advantage that the polymer can be displaced more easily, especially when the temperature of the embossing tool is adapted to the melting temperature of the material to be embossed. However, the higher the temperature of the embossing tool, the higher the risk of adhesion to the tool and therefore the need for anti-stick modifications. In cases, in which the embossing tool has low thermal conductivity, it can be sufficient to pre-heat the casing and emboss with a tool, which is not heated. The pressure necessary for embossing depends not only on the temperature of the thermoplastic material (with respect to its melting temperature) but also on its viscosity at said temperature.

Optionally the face of the embossing tool can be profiled in such a way, that it supports the material flow towards the channels of the (yarn) pattern and/or that it enlarges the surface in the embossed areas, in order to modify the retaining capacity and/or the meat adhesion. The embossing pegs may have e.g. large-radius-sphere-section-shape or small-height-pyramid-shaped faces, in order to facilitate the polymer flow. The embossing tool, the embossing pattern and the casing itself need to be suitably designed in order to obtain high quality edges of the tubular casing or flat film. The substrate needs to have a tight tolerance regarding flat width, wall thickness and layer thicknesses as well as positioning with respect to the embossing tool. According to the method for preparing a thermoplastic food casing as outlined above, in spite of the typical tolerances, high quality edges can be produced.

The method of pre-heating the food casing usually depends on the material used to form the food casing. For example, for polyamides, polyesters and olefin polymers as used herein, heating with IR radiation usually to temperatures of 100° C. or higher can be used. But any pre-heating can be done completely or can be supported by contact methods with heated plates or heated rollers. Stickiness of heated casing surfaces can be reduced by slip/release/antiblock additives in the recipe of the inner and/or outer surface layers, by use of release agents on the surfaces of the casing and/or of the embossing tool and/or by surface materials of the embossing tool, which have low adhesion to the heated polymer. PA-containing layers should be dry to avoid formation of humidity gas bubbles.

When the food casing is tubular and the food contact surface on the outside shall be deformed by embossing, which takes place in a collapsed state of the casing, a multilayer casing is preferred, because the risk of sealing the inside surfaces of the tubular casing together in an embossing and/or a thermoforming step can be reduced or even avoided by selecting thermoplastic materials for the inner surface layer which have a sufficiently higher melting temperature than the temperature needed for embossing the food contact layer. The difference between the melting temperature of the material on the inside surface and the melting temperature of the outside food contact surface, with the melting temperatures measured according to DIN EN ISO 11357-3, should be larger than 30° C., preferably larger than 40° C., more preferably larger than 50° C., most preferably more than 60° C.

When embossing a multilayer casing, according to the present invention nearly all the material of the layer(s) having a lower melting point should be displaced towards areas of lower retaining capacity, so that the areas of higher retaining capacity only consist of materials having a higher melting point. This allows a very effective use of the respective materials at the target location in the final casing.

If the casing is a tubular monolayer casing, the embossing step has a high risk of sealing the casing internally together. Avoiding the embossing step, as an alternative the non-deformed food casing is subjected to a print process with a food-additive repellent varnish before a thermoforming step takes place. The varnish is printed in the design of the grid, the grid needing to be positioned in the following thermoforming step in the respective, not-to-be-thermoformed locations. When the coating with the at least one functional additive is applied, the grid does not have retaining capacity, thus leaving the grid not as dark as the area of the bulges.

A further possibility to locally increase the retaining capacity of a food casing is to emboss further cavities into the food contact surface of the casing, which offer additional area and space for the collection of the transferable functional additive in the coating process.

In another preferred embodiment a non-oriented (co)extruded thermoplastic food casing is embossed in such a way that in areas having a lower retaining capacity the average wall thickness of the food casing is at least 4 times higher than in areas having a higher retaining capacity, more preferably by at least 8 times, most preferably by at least 12 times. E.g. when a casing, which has a wall thickness of 190 µm, is embossed by an embossing tool with square-shaped male areas of 16×16 mm$^2$, which are spaced 2 mm apart, after embossing the thickness of square-shaped areas which form hole areas of a net may be around 20 µm, and the squeezed out material is piling up around the embossed squares to a practically semi-circle-shaped yarn height of approximately 1 mm, wherein a ratio of the wall thickness of areas having lower retaining capacity and the wall thickness of areas having a higher retaining area is around 0.02. Embossing squares and turning the casing inside out, results in a three-dimensional textured casing whose texture is being imprinted onto the surface of the sausage. The squeezed out material forms for example a net-like grid, while the embossed squares are thin enough to bulge out under the stuffing pressure. Optionally the casing can have additional non-food-contact layers and/or the bulges can be thermoformed.

In addition, when the inside surface of the embossed and reversed casing is coated with a liquid for example via bubble coating, squeezing the casing between nip reels cannot completely remove all the liquid out of the embossed squares so that again more functional additive is locally present so that a net-like color pattern (light grid and darker meshes) can be transferred to the enclosed food.

Another preferred method for preparing a (co)extruded thermoplastic food casing comprising on its inside surface a textured surface, makes use of a thermoforming process. Thermoforming locally stretches the casing and increases the retaining capacity, so that a textured casing is obtained. The thermoforming of tubular casings can be carried out using specifically designed molds as in conventional corrugator lines. For flat film, conventional thermoforming lines can be used.

Prior to thermoforming a tubular casing, the casing is pre-heated to a thermoforming temperature of the casing structure. If the food contact surface is the outside surface at the time of thermoforming, the area of the bulges need to be mechanically stretched inwards against the air pressure of the inflated casing. If the food contact surface is the inside surface, the area of the bulges will be pneumatically stretched into the thermoforming mold, optionally sucked into the thermoforming mold by vacuum. In both cases, the process of thermoforming a tubular casing requires a control of the air pressure inside the inflated casing. Depending on the position of the thermoforming step in the process, the air pressure control can be achieved through the inflated straight or de-reeling starting casing, through the inflated straight or reeled final casing and/or by maintaining the air pressure between movable nip-reels.

If the casing is a tubular monolayer casing, an embossing step, which takes place in a collapsed state of the casing, has a high risk of sealing the casing internally together. This risk is low during thermoforming as the thermoforming step can also be done in a preferred inflated state of the casing.

By the defined local stretching of the casing in thermoforming the retaining capacity of the food casing can be increased. For example, carrying out a local stretching of the casing during thermoforming by an draw ratio of surface area after thermoforming to surface area prior to thermoforming of e.g. 3, then coating the casing's entire surface with the same amount per surface area of a functional additive and then—in an annealing step—allowing the stretched areas to shrink back by e.g. 30% in both machine direction and transversal direction, doubles the available amount of transferable functional additive in the thermoformed and then annealed areas in comparison to the non-thermoformed areas, because after annealing the coated thermoformed area is reduced by 51%. To obtain a textured surface by using a stretching treatment which will give rise to formation of a e.g. net-like pattern on the enclosed food, the retaining capacity of the food casing shall be locally increased by at least 30 g of demineralized water per m$^2$, preferably by at least 80 g of demineralized water per m$^2$, most preferably by at least 250 g of demineralized water per m$^2$. But it can be that the retaining capacity created by the thermoforming step is much larger, namely leading to a retaining capacity of 1000 g of demineralized water per m$^2$ or even more, depending on the area to be thermoformed and taking into account that—due to the local shrinkability induced by the local stretching in the thermoforming step—some of the thermoformed depth is lost by shrinkage, when exposed to a process step at elevated temperatures, like e.g. the cooking process.

Considering that the cooking process is taking place at temperatures, at which the shrink of stretched areas can be released, for achieving a bulged, e.g. net-like pattern on the foodstuff it is advisable to stretch the casing in thermoforming and/or to anneal the casing in such a way, that complete reversing of the deformation during cooking is avoided. This can include the use of moveable heated molds, which allow a relaxation of internal tensions under mold constraint.

The above-mentioned methods embossing and thermoforming can also be combined so as to produce a (co)extruded thermoplastic food casing comprising on its food contact surface a textured surface which forms a net-like pattern.

For convenience, if the casing is a flat film or a cut-open tubular film, the steps of embossing and/or thermoforming the food contact surface and the coating step with the functional additive can be done before sealing the film to a tube. The sealing can be done e.g. by heated tool welding or preferably by ultra-sonic welding, but depending on the materials used in the structure any other known sealing method can be used, including gluing.

Optionally, the extruded food casing may be mono-axially or bi-axially stretched e.g. with the aid of an air-cushion between two squeezing rollers. During the stretching, the thermoplastic material of the casing is oriented and the casing gains a back-shrinkage (which may be gradually reduced by heat setting) so that the casing is in a tight and well-rounded condition even after use by a "fill-and-cook-in" procedure. However, the aforementioned limitations need to be considered.

To emboss for example the holes of a net ("thin embossing") is especially preferred for non-oriented casings. The embossing shall reduce the wall thickness of the casing in the location, where a net would have the holes (without actually creating holes in the casing), relocating this material to the location of the grid, which thereby increases in wall thickness. When this casing is being reversed and stuffed, after peeling, the grid is visible as dents in the sausage, while the thinned casing is bulging out, thus giving the typical topology of a net-cooked product. Optionally the bulging-out can be enhanced by subjecting the embossed casing to a following thermoforming process, e.g. by means of a corrugator. Externally coated prior to any reversion step, the casing may transfer color as a functional food additive in different degree, further supporting the impression of a net-cooked casing. If the casing is only embossed, the impregnation may form pools in the embossed areas so that after drying these areas contain more of the transferable functional additive than the grid areas. If the casing is additionally thermoformed before coating, the thermoformed areas can shrink, e.g. in a drying step, to such an extent that the amount transferred in the thermoformed bulges is higher than the amount transferred via the grid surface.

The coating step is typically carried out separately from the extrusion process in order to maintain flexibility in production. However, it is also possible to carry out an outside coating process together with the extrusion, embossing, thermoforming and/or annealing steps in an in-line process if the at least one absorbing layer is accessible, i.e. is outside in the case of a tubular casing.

In a preferred embodiment the food casing of the present invention, which shall take up the at least one transferable functional additive, the coating of the outside surface takes place with spraying techniques or by immersing the casing into a bath. Conventional printing techniques are difficult to use because of the textured surface of the casing having relatively large wall thickness differences. However, flexible coating knifes can be an option. Typically, a separate drying step is not necessary if the dosage is adequate. Nevertheless, a drying step, which at the same time may serve as an annealing step if the heat stability of the functional additive is high enough, may be helpful to immobilize the at least one transferable functional additive. Drying can take place by conventional drying technologies like hot air, infrared or other means, including air-blades. While usually air-blades will be set-up in such a way that they are not blowing off the coating, they may be helpful for blowing off surplus coating from lower retaining capacity areas or oversaturated locations. If the air-blade is making use of cold air, annealing is not possible, but also shrink will not be released.

If annealing is desired to reduce the shrinkage of the casing and of the thermoformed areas, an annealing step can be introduced assuring that the casing is heated up to the annealing temperature under sufficient tension not to destroy the geometrical properties.

When outside coating via spraying is applied or inside spraying during shirring is carried out, the spraying is often performed in such a way so as to assure a homogeneous coating of a cylindrical surface in g/m². This may lead to less coating per surface area in thermoformed areas than in non-thermoformed areas, because the surface area is actually enlarged where the stretching of the thermoforming takes place, while the sprayed amount of functional additive is typically not increased when spraying onto a location showing a (thermoformed) deflection from the cylindrical shape. Coating methods, which cover the casing surface completely, like externally flooding or dipping into a bath, coat the entire surface area and lead to a distribution of the at least one functional additive depending on the local retaining capacity, which is higher in the thermoformed bulges and lower on non-thermoformed areas. The use of a doctor blade will even enhance the effect, scraping off functional additive especially from areas of higher thickness. If the retaining capacity of the embossed and/or thermoformed areas is too high for the desired coloring effect, retained functional additive may be removed from these areas by for example blowing air, scraping with flexible doctor blades, using sponges or height-adjustable suction devices. The effective use of these or further methods depends on the height difference between the areas of thin and thick wall thickness. In many cases, leading the casing upwards (if not vertically) for a certain time before a horizontal drying step commences, removes unwanted functional additive quantities effectively.

Alternatively, the casing of the present invention, which after embossing and/or thermoforming shall take up the at least one transferable functional additive, may be transferred through two pairs of squeezing rollers arranged one after the other, where there may be located a bubble of liquid containing the composition containing the at least one transferable functional additive which is preferably a solution or a suspension of said at least one transferable functional additive. This impregnation by a moving bubble is possible when the embossed and optionally thermoformed casing with an outside surface having retaining capacity has been reversed or the at least one surface having retaining capacity is already an inner layer of a tubular only thermoformed casing or of an embossed, optionally thermoformed and sealed flat film.

When internally coating the textured casing having a thermoformed patterned retaining capacity with a moving bubble between pairs of nip reels, the flattened thermoformed bulges may trap liquid, which is not being squeezed out of the casing. In this case it is advisable that the bubble passes the casing at such speed that the casing does not have time to become saturated by the at least one transferable functional additive while being between the pairs of nip reels so that the trapped liquid may be absorbed to some extent by the thermoplastic material of the casing during the following storage of the impregnated casing. This absorption of the liquid functional additive can be increased by using the aforementioned hydrophilic components in the recipe of the layers coming into contact with the functional additive.

If the impregnation with the at least one transferable functional additive takes place before the optional thermoforming process, after thermoforming, the thermoformed areas will comprise less additive per surface area than the non-thermoformed areas, so that on the final foodstuff the bulges will be less coated by transferable functional additive per area than the grid areas. In order to resemble a net-cooked product, this appearance is not preferred, but there may be designs, which favor this look, so that carrying out impregnations before a mechanical or thermal treatment of the casing becomes advisable.

The final food casings according to the invention usually have a total wall thickness, depending on the pattern formed in the range of from 1 µm to 2000 µm, preferably in the range of 5 to 1500 µm, more preferably in the range of 10 to 1000 µm.

Optionally the casing can be shirred with conventional technology as known to the person skilled in the art. Alternatively the usage from the reel, in sections or as bags is possible as well.

If the food casing shall be sealed, e.g. to create tubular casings or bags, the layer sequence, the recipe of the layers and the design of the film needs to reflect that the embossing and the thermoforming steps create areas with differing wall thickness, which may need different sealing time and/or sealing pressure and/or sealing energy if the chosen sealing method relies on heat transfer through the casing's layers to the inside sealing area. To avoid large thickness differences in the sealing area, a laminated film or cast film can be composed of a to-be-embossed food contact layer with reduced width in comparison to the outer layer(s), so that the outer layer(s) can be sealed in an overlap seal directly to each other. Another option is to leave the seal area without embossing and/or thermoforming treatment. This can be achieved by designing the embossing cylinders or the embossing plates according to the bag dimensions and sealing needs. Alternatively an embossed flat film can be laminated to a heat sealable film for turning the flat film into a tubular casing by sealing an additional stripe of the same heat sealable material onto the overlap or with the edges of the film in an edge-to-edge position.

Based on the above properties a coated or impregnated food casing according to the invention can be stuffed with foodstuff, especially with meat products like sausage or ham emulsion or processed cheese or fish products, and transfer the coloring or flavoring functional food additives onto the foodstuff during cooking and/or storage.

The invention will now be described using examples of embodiments and comparative example, but without limiting the scope of the invention.

EXAMPLES

The following raw materials were used in the production of all the examples 1, 2 and 3 and all the comparative examples C1 through C6:
tie: modified polyolefin: Admer NF 518E by Mitsui Chemicals
PE: polyolefin: Exceed 2018 KB by ExxonMobil
PA: polyamide: UBE5033B by UBE The non-oriented casing used in Example 1 and for Comparative Examples C1 and C3 was produced on a tubular film extrusion line with 3 extruders. The tubular casing was produced by plasticizing and homogenizing the raw materials described above in the respective extruders, having melt temperatures of around 220° C. in the case of the polyamide based layer and around 200° C. in the case of the polyolefin-based layers. The 3 melt-flows were coextruded by using a 3-layer head at 225° C. in which the individual flows were joined in quantitative ratios according to the desired wall thickness of the individual layers and extruded through an annular die.

Example 1 is a non-oriented tubular 3-layer casing formed of 20 μm polyamide as the inner layer, 8 μm modified polyolefin (tie=adhesive) and 88 μm polyolefin on the outside at the time of extrusion. The flat width was 140 mm. The unwound casing was preheated by infra-red heating to a temperature of approximately 135° C., i.e. above the melting temperature of the polyolefin layers, but below the melting temperature of the polyamide layer. Then the flat tubular casing was embossed for 15 s at 80 bar hydraulic pressure in a hydraulic cylinder of 45 mm diameter between 2 fluroethylene polymer (PTFE-)coated and heated embossing tools of 280 mm length and 250 mm width, which tools were heated to a temperature of approximately 120° C. and capable of embossing squares of 17 mm side length. Between the squares were gaps in the shape of a half-pipe of 1 mm diameter and depth 0.8 mm, representing the net-like grid. After the embossing, the thin-embossed areas had a thickness of approximately 70 μm, while the grid areas had a thickness of up to 0.8 mm, filling the half-pipe-shaped gaps of the embossing tool. The embossed casing was corona-treated to have a wetting tension of 40 mN/m in the thin-embossed squared areas and thereafter coated with the functional additive SmokEz Cherrywood Poly2515 by Red Arrow via spraying the functional additive onto the horizontal upper side of the casing, wherein the amount sprayed onto the casing, filled the non-grid areas nearly to the height of the grid (contact time 1 min). The amount of functional additive in the embossed areas of higher retaining capacity was reduced by guiding the casing upwards in a 10°-angle for 1 min, before guiding the casing into a horizontal drying step in an air stream of 80° C. The drying was stopped when the functional additive was dry enough to pass the next step. After the drying, the casing was turned upper side facing downwards and the coating process was carried out for a second time. The casing was reversed before stuffing.

The non-oriented 3 layer casing used in Examples 2 and 3 and for Comparative Examples C2 and C4 was produced in the same way as the casing of Example 1 and Comparative Examples C1 and C3, except that a higher speed of the extrusion line was used so that the 3-layer casing had a reduced wall thickness formed of 15 μm polyamide as the inner layer, 6 μm modified polyolefin (tie=adhesive) and 66 μm polyolefin on the outside at the time of extrusion. The flat width was 140 mm.

For Example 2 the unwound casing was preheated by infra-red heating to a temperature of approximately 135° C., i.e. above the melting temperature of the polyolefin layers, but below the melting temperature of the polyamide layer. The flat tubular casing was embossed for 15 s at 80 bar hydraulic pressure in a hydraulic cylinder of 45 mm diameter between 2 PTFE-coated embossing tools of 280 mm length and 250 mm width, which tools were heated to a temperature of approximately 120° C. and capable of embossing squares of 17 mm side length. Between the squares were gaps in the shape of a half-pipe of 1 mm diameter and depth 0.6 mm, representing the net-like grid. After the embossing the thin-embossed areas had a thickness of approximately 60 μm, while the grid areas had a thickness of up to 0.6 mm, filling out the half-pipe-shaped gaps of the embossing tool. The embossed casing was corona-treated to have a wetting tension of 40 mN/m in the thin-embossed squared areas and then coated, dried and reversed before stuffing in the same way as Example 1.

Example 3 has the same structure as Example 2, but was trimmed along one edge to have an opened flat width of 270 mm. The opened casing was preheated by infra-red heating to a temperature of approximately 135° C. and embossed for 15 s at 80 bar hydraulic pressure in a hydraulic cylinder of diameter 45 mm by one PTFE-coated embossing tool of 280 mm length and 250 mm width, which tools were heated to a temperature of approximately 120° C. and capable of embossing squares of 17 mm side length. Between the squares were gaps in the shape of a half-pipe with 1 mm diameter and 0.6 mm depth, representing the net-like grid. The film was positioned with respect to the tool so that 10 mm on both edges of the opened film were not embossed. After the embossing the thin embossed areas had a thickness of approximately 60 μm, while the grid areas had a thickness of up to 0.6 mm, filling out the half-pipe-shaped gaps of the embossing tool. The embossed film with the to-be-thermoformed thin square-shaped areas was corona-treated to have a wetting tension of 40 mN/m in the thin-embossed squared areas and pre-heated by infra-red heating onto the non-embossed side to thermoforming temperature of the to-be-thermoformed areas of approximately 100° C. In a thermoforming station, while the film was held in place by the film's grid areas interlocking with a negative pattern for the grid in the upper tool's film-contact surface, the square-shaped areas were pressed by vacuum in the lower mold and air pressure in the upper mold homogeneously into the cavities of the lower mold, which had the shape of—in the direction perpendicular to the plane of the film—overstretched bulges (depth of 10 mm), thus stretching the embossed square-shaped areas by a draw ratio of around 3 to 4. After the thermoforming, the depth of the bulges was reduced by infra-red heating to around 3 to 4 mm. In a next step the embossed and thermoformed casing was coated with the functional additive SmokEz Cherrywood Poly2515 by Red Arrow via spraying functional additive onto the horizontal film. In contrast to Example 2, the bulges were not flooded, but were only coated with a relatively fine mist of the liquid smoke. When reaching the following horizontal drying step, some of the liquid smoke started to collect in the bottom of the thermoformed bulges. Drying the liquid smoke in an air stream of 80° C. immobilized the functional additive. Finally the film was sealed to a tube with the coated side inwards using a 30 μm thick band of UBE 50333B, being sealed to the PA-layer of the non-overlapping non-embossed and non-thermoformed edges of the film by 2 longitudinal ultrasonic welding seams of 1 mm width, having sufficient seal strength to survive the cooking cycle. The casing of Example 3 did not have to be reversed before stuffing.

Comparative Example C1 was prepared in the same way as Example 1 with the exception that the embossing movement was restricted by positioning 0.22 mm-thick steel bands between the surfaces of the 2 molds in such a way that the compression of the tubular film between the 2 molds stops at a distance of the 2 surfaces of 0.22 mm (with parallel mold surfaces), thus reducing the formation of the grid.

Comparative Example C2 was prepared in the same way as Example 2 with the exception that the embossing movement was restricted by positioning paired 0.08 mm-thick steel bands between the surfaces of the 2 molds so that the compression of the tubular film between the 2 molds stops at a distance of the 2 surfaces of 0.16 mm, thus reducing the formation of the grid.

Comparative Examples C3 and C4 are the non-embossed, non-thermoformed starting casings of Example 1 and Example 2, respectively. After corona-treatment to have a wetting tension of 40 mN/m, the Comparative Examples were coated with SmokEz Cherrywood Poly2515 by Red Arrow via spraying the functional additive onto the upper side, the amount sufficient to cover the surface and flow off the edges of the casing and having a contact time of 1 min, then guiding the casing upwards in a 10°-angle for 1 min, drying the upper side in a horizontal drying step in an air stream of 80° C. and—after turning the upper side to face downwards—also coating the lower side of the casing without submitting the casings to an embossing and/or thermoforming step. The drying step immobilized the functional additive. The casing was reversed before stuffing.

The non-oriented 5-layer casing used in Comparative Examples 5 and 6 was produced in the same method as the casing for Example 1, but achieving different layer thicknesses by distributing the outer PE-layer of the 3-layer structure onto 3 extruders, so that the casing of Comparative Examples 5 and 6 had an increased wall thickness formed of 20 μm polyamide as the inner layer, 20 μm modified polyolefin (tie=adhesive) and 3 layers of 60 μm each of polyolefin on the outside at the time of extrusion. The flat width was 140 mm.

For Comparative Example 5 the casing was preheated by infra-red heating to a temperature of approximately 135° C., i.e. above the melting temperature of the polyolefin layers, but below the melting temperature of the polyamide layer. The flat tubular casing was embossed for 30 s at 80 bar hydraulic pressure in a hydraulic cylinder of diameter 45 mm between 2 PTFE-coated embossing tools of 280 mm length and 250 mm width, heated to a temperature of approximately 120° C. and capable of embossing squares of 34 mm side length. Between the squares there were gaps in the shape of a half-pipe of 2 mm diameter and depth 2 mm, representing the net-like grid. After the embossing, the thin-embossed areas had a thickness of approximately 55 μm, while the grid areas had a thickness of up to 2 mm, filling out the half-pipe-shaped gaps of the embossing tool. The embossed casing was corona-treated to have a wetting tension of 40 mN/m in the thin-embossed squared areas, then coated and dried in the same way as Example 1, and finally reversed before stuffing.

Comparative Example C6 is the starting casing of Comparative Example C5. After corona-treatment to have a wetting tension of 40 mN/m, Comparative Example C6 was coated with SmokEz Cherrywood Poly2515 by Red Arrow via spraying the functional additive onto the upper side, the amount sufficient to cover the surface and flow off the edges of the casing and having a contact time of 1 min, then guiding the casing upwards in a 10°-angle for 1 min, drying the upper side in a horizontal drying step in an air stream of 80° C. and—after turning the upper side to face downwards—also coating the lower side of the casing without submitting the casings to an embossing and/or thermoforming step. The drying step immobilized the functional additive. The casing was reversed before stuffing.

Table 1 gives an overview of the examples prepared.
Sample Evaluation

The examples were characterized using the following evaluation methods.
Retaining Capacity (RC)

The retaining capacity of a casing surface is evaluated by determining the weight of demineralized water entrapped between the textured side of the casing, which is fixed to a first rectangular cuboid-shaped glass plate (10 cm×10 cm×1.3 mm, weight=31 g) using a double sided adhesive tape, and a second glass plate of the same dimensions, placed on top of the textured surface and loaded with a weight of 5 kg. The test takes place at room temperature (25° C.) and ambient pressure (1 bar). First, the adhesive tape (double-sided Handicraft Tape Extra Strong by Tesa SE) is fixed to one side of the glass plate, covering its surface with the adhesive. Through the glass it can be checked that no air-bubbles are entrapped. Then a 10 cm×10 cm sample of the casing is fixed air-bubble-free with the textured side facing away from the adhesive onto the adhesive tape. The combined weight of the 2 glass plates, adhesive tape and casing sample is weighed on a scale (for a maximum weight of 420 g with d=0.001 g by Sartorius). The glass plate with the sample is placed on top of a horizontally levelled paper stack of dimensions 9 cm×9 cm and a height of at least 2 cm, in order to let surplus water drop down from the test set up, once that the textured surface is flooded. Then the entire textured surface is flooded with demineralized water and the second glass plate is placed on top of the water covered textured surface, squeezing out surplus water. Finally the additional weight is placed on top of the second glass plate, further squeezing out surplus demineralized water. The glass plate and weight rests on top of the areas of lower retaining capacity of the textured surface for 1 min. After carefully wiping off any water attached to the accessible surfaces of both glass plates and removing the 5 kg-weight, the test set-up is weighed again. The difference in weight between the test set-up with and without demineralized water is the retaining capacity of the casing per 100 cm². The measured weight difference is multiplied with a factor of 100 to obtain the retaining capacity in g/m².

Textured patterns are likely to repeat themselves in such a way, that the 2 glass plates are practically parallel to each other. If the pattern design is leading to a significantly tilted upper glass plate, the glass plates can be chosen to be larger in order to be touching the patterns at locations, which lead again to a practically parallel positioning of the 2 glass plates, with the texture separating them.

In order to evaluate the retaining capacity of thermo-formed areas, the casing sample is positioned with its food contact surface upwards onto a mask, which supports the casing from below in the non-thermoformed (grid-) areas of maximum wall thickness only and has adequately large cavities within to allow the thermoformed areas to extent into the mask's cavities when filled with the demineralized water. The used mask of 10 cm×10 cm×1 cm was prepared out of a PMMA-block. With double sided adhesive tape, the mask is fixed onto the glass plate and the casing sample onto the upper side of the mask. The test set-up to be weight now includes the mask and the additional tape used at the supporting locations. Then it is possible to fill the thermo-formed geometry with demineralized water and place the second glass plate on top of the textured surface to determine the retaining capacity according to the invention.

For the RC, 3 locations, the number of locations being sufficient to include the entire circumference in the evaluation, were evaluated and the average value calculated.

Wall Thickness of an Area of Lower Retaining Capacity (WT LRC)

Before actually measuring the wall thickness of an area of lower retaining capacity, areas having a lower retaining capacity need to be determined. To do so, a rectangular cuboid-shaped glass plate of 10 cm×10 cm×1.3 mm (weight=31 g) was covered air bubble-free with double-sided adhesive tape (double-sided Handicraft Tape Extra Strong by tesa SE). The tubular casing was cut open and pressed with the non-textured side flat onto the adhesive tape, avoiding entrapping air bubbles. The sample was trimmed along the edges of the glass plate by means of a carpet knife. Then a second glass plate of same dimensions was covered air bubble-free with double-sided adhesive tape to fix air bubble-free a piece of carbon paper (Plenticopy 200 H by Pelikan Group GmbH) to this second glass plate. On the opposite side of the glass plate a 200 g-weight was fixed with the double-sided adhesive tape. With the carbon paper facing downwards the glass plate was placed on top of the textured side of the sample and was moved back and forth at least 3 times by approximately 1 cm in the 2 directions parallel to the edges of the glass plate across the textured sample, so that the color of the carbon paper stained all areas of the textured side of the sample, which were in contact with the upper glass plate, marking the locations of lower retaining capacity to be analyzed.

According to the present invention the average thickness of the thermoplastic food casing in an area of lower retaining capacity is determined at 5 locations marked with the color of the carbon paper. Not 4 of the 5 locations shall be in one line and each of the 5 locations at least 4 cm apart from each other. After storing the sample for 1 day at the testing conditions of 23° C. and 50% r.h., the thickness at these 5 locations is measured according to DIN 53370:2006-11 method F (for embossed films) by means of a thickness gauge, having a measurement surface diameter of 8 mm and a contact pressure of 20 kPa.

For one average thickness value of WT LRC, 5 locations were evaluated.

Wall Thickness of an Area of Higher Retaining Capacity (WT HRC)

After storing the sample for 1 day at the testing conditions of 23° C. and 50% r.h., the wall thickness of the thermoplastic food casing in an area of higher retaining capacity is determined by means of a thickness gauge with contact force 0.5 N, scanning with multiple measurements (at least 10 measurements) according to DIN 53370:2006-11 4.1.2 method P for the lowest wall thickness along the 10 connecting lines between each pair of the 5 locations measured for the determination of the thickness of areas of lower retaining capacity. As the removal of the sample from the adhesive tape may lead to a deformation of the sample, a fresh casing sample can be used, looking for 5 locations, which are similarly positioned within the texture as the locations identified for WT LRC.

In case that the areas of higher retaining capacity cannot be made accessible to the measuring tip as defined in DIN 53370:2006-11 4.1.2 method P, the thickness of these areas is determined on thin sections under a light or optical microscope. The 20 μm-thick thin-sections of the (co)extruded thermoplastic food casing are cut parallel along the connecting lines of the 5 locations and are analyzed by light microscopy in a suitable magnification and contrast (e.g. 400×, polarized light in light transmission mode), so as to determine the WT HRC. In case that the casing cannot be cut without separation of the thin-section, a cryo-microtome may be helpful and/or the sample can be embedded in curing resin prior to cutting.

For one average value of WT HRC, the 10 lowest thicknesses of the 10 connecting lines are determined and the average value calculated.

The thickness difference between the areas having higher retaining capacity and the areas having a lower retaining capacity is calculated by subtracting the average value of WT HRC from the average value of WT LRC.

The wall thickness ratio is calculated by dividing the average value of WT HRC by the average value of WT LRC.

Bulge Height

For the determination of the bulge height of the final, peeled sausage a calliper ruler with d=0.1 mm was used. 5 slices of 50 mm width were transversally cut from the cooked and cooled non-peeled sausage. The core of each slice was cut out circularly in such a way, that a cylindrical ring of approximately 5 mm thickness plus the depth of possible bulges and 50 mm width remained. The ring was cut open, placed flat onto a table surface and peeled. A rectangular cuboid-shaped glass plate of 10 cm×10 cm×1.3 mm (weight=31 g) was placed across at least 3 bulges and the distance between the base between two bulges and the lower surface of the glass plate was measured with the caliper ruler. 2 locations per slice were measured, and from the 10 measurements one average value was calculated.

Additive Barrier

For the evaluation of the additive barrier, the surface of the cooked unpeeled sausage was wiped off with a white paper cloth. Any transfer of functional additive through the casing is noted. "Outside clean" means that a color change of the white paper cloth was visually not detected.

Surface Pattern after Cooking

Bologna-type sausages were prepared by stuffing meat emulsion into the impregnated sample material, cooking the sausages in a cooking chamber at 76° C. for 3,5 hours and cooling them down over night to 3° C. in a cooling chamber. The transferred pattern of functional additive on the surface of the peeled final sausage was visually evaluated as visibility of a lighter grid pattern versus darker non-grid areas on a scale from 0 (=grid pattern not visible) via 1 (=grid pattern slightly visible) and 2 (=grid pattern well visible) to 3 (=grid pattern strongly visible).

Table 1 shows the results of the evaluated properties.

| E | layers in/core/out | oriented | embossed | thermo-formed | WT orig. μm | WT LRC μm | WT HRC μm | WT diff. μm | WT ratio — | RC g/m² | bulge height mm | additive barrier additive on the outside | pattern visible 0 = no to 3 = strong |
|---|---|---|---|---|---|---|---|---|---|---|---|---|---|
| 1 | PE/tie/PA | no | yes | no | 116 | 851 | 69 | 782 | 0.081 | 603 | 0.9 | no | 2 |
| 2 | PE/tie/PA | no | yes | no | 87 | 654 | 58 | 596 | 0.089 | 466 | 0.7 | no | 2 |
| 3 | PE/tie/PA | no | yes | yes | 87 | 647 | 40 | 607 | 0.062 | 1766 | 2.3 | no | 3 |
| C1 | PE/tie/PA | no | yes | no | 116 | 252 | 110 | 142 | 0.437 | 148 | <0.2 | no | 1 |
| C2 | PE/tie/PA | no | yes | no | 87 | 214 | 81 | 133 | 0.379 | 140 | <0.2 | no | 1 |
| C3 | PE/tie/PA | no | no | no | 116 | 120 | 113 | 7 | 0.941 | 22 | no bulges | no | 0 |
| C4 | PE/tie/PA | no | no | no | 87 | 91 | 85 | 6 | 0.934 | 19 | no bulges | no | 0 |
| C5 | PE/tie/PA | no | yes | no | 220 | 2069 | 54 | 2014 | 0.025 | 1396 | 2.1 | no | 3 |
| C6 | PE/tie/PA | no | no | no | 220 | 227 | 214 | 13 | 0.943 | 29 | no bulges | no | 0 |

The samples of the non-embossed and non-thermoformed Comparative Examples C3, C4 and C6 showed neither bulging nor a net pattern. The smoke transferred in an irregular and light pattern as most of the liquid dripped off the casing before reaching the drying zone and the remaining liquid was dried without pattern on the surface.

Comparative Examples C1 and C2 showed a slightly visible pattern, but without a significantly textured topology.

On the contrary, the examples according to the invention show a good additive transfer and not allowing the transferable functional additive to migrate to the outside. Most importantly there is a distinct difference in color between the area of the non-grid locations and the color of the grid location. The sausage is brown to dark brown corresponding to the retaining capacity.

The thin areas of Example 1 bulge out slightly by the stuffing pressure, while the thick grid, resulting from the embossing, leaves its marks impressed on the surface of the cooked and peeled foodstuff.

Comparative Example C5 also showed a well-visible pattern and textured topology, but the clip area could not be closed air-tight, as was visible by air bubbles leaving through the clip of an inflated clipped casing section immersed into water.

The examples according to the invention could be stuffed and cooked without breakages. The examples according to the invention showed a homogeneous intense transfer of the functional additive in the non-grid areas, leaving the grid lighter and 3-dimensionally imprinted, in contrast to the unsatisfactory transfer of the comparative example.

The examples according to the invention show a good to excellent retaining capacity for liquids. The amount of liquid possible to be retained is higher after the treatment according to this invention than the amount of liquid retained without this treatment. Depending on the raw materials used and the realized deformation, the retaining capacity can be defined in a wide range.

As described above, alternatively hydrophilic substances can be incorporated into the barrier layers to increase the water vapor transmission of the casing according to the invention or they can be incorporated into the absorbing layers to increase the absorption of the transferable functional additive.

Summarizing, the examples show that the casings according to the invention combine retaining capacity, transfer capability, non-permeability to the functional additives, selective coloration and texture typical of a net-cooked product, versatility in the pattern design, and reliable mechanical properties.

The invention claimed is:

1. A functional additive transferring (co)extruded thermoplastic food casing comprising:
    a water vapor barrier and/or oxygen barrier effect,
    wherein an inside surface of said thermoplastic food casing has a textured surface which forms a three-dimensional pattern of higher and lower retaining capacity for a functional additive,
    wherein said thermoplastic food casing having a textured surface is either a monolayer casing or a multilayer casing, for which the inside surface is the textured surface and comprises as a main component at least one thermoplastic copolymer material selected from the group consisting of (co)polyamides, (co)polyolefins, (co)polyester and vinylidenchloride (co)polymers,
    wherein said (co)extruded thermoplastic food casing does not comprise a net and/or a material forming a net or any other three dimensional structure on its outside surface,
    wherein the average thickness of the thermoplastic food casing in the areas having a higher retaining capacity is in a range of from 1 to 100 μm, and wherein the average thickness of the thermoplastic food casing in the areas having a lower retaining capacity is in a range of from 191 to 2000 µm, provided that the thickness difference between the average thickness in said areas having higher retaining capacity and the average thickness in said areas having a lower retaining capacity is in a range of from 160 to 1950 µm and that a ratio of the average thickness of the thermoplastic food casing in the areas having a higher retaining capacity and the average thickness of the thermoplastic food casing in the areas having a lower retaining capacity is in a range of from 0.002 to 0.25.

2. The thermoplastic food casing according to claim 1, wherein said (co)extruded thermoplastic food casing having a textured surface on the inside surface which forms a three-dimensional structure forms a net-like pattern of higher and lower retaining capacity for a functional additive.

3. The thermoplastic food casing according to claim 2, wherein said (co)extruded thermoplastic food casing having a textured surface on the inside surface which forms a net-like pattern of higher and lower retaining capacity for a functional additive is a seamless (co)extruded thermoplastic food casing.

4. The thermoplastic food casing according to claim 1, wherein said (co)extruded thermoplastic food casing in case of a monolayer casing or the inner layer comprising the inside surface having a textured surface thereof in case of a multilayer casing comprises as a main component a (co)polyolefin and at least 5 weight-% of a (co)polyamide based on the weight of the thermoplastic food casing or the inner layer having a textured surface.

5. The thermoplastic food casing according to claim 1, wherein the thickness difference between the average thickness in said areas having higher retaining capacity and the average thickness in said areas having a lower retaining capacity is in a range of 300 to 1000 µm and wherein a ratio of the average thickness of the thermoplastic food casing in the areas having a higher retaining capacity and the average thickness of the thermoplastic food casing in the areas having a lower retaining capacity is in a range of from 0.01 to 0.20.

6. The thermoplastic food casing according to claim 1, wherein the thickness difference between the average thickness in said areas having higher retaining capacity and the average thickness in said areas having a lower retaining capacity is in a range of 400 to 800 µm and wherein a ratio of the average thickness of the thermoplastic food casing in the areas having a higher retaining capacity and the average thickness of the thermoplastic food casing in the areas having a lower retaining capacity is in a range of from 0.04 to 0.10.

7. The thermoplastic food casing according to claim 1, wherein the thermoplastic food casing comprises at least two layers, wherein the melting temperature of the material forming the innermost layer and the melting temperature of the material forming the outermost layer differs by more than 30° C., preferably by more than 60° C.

8. The thermoplastic food casing according to claim 1, wherein the (co)extruded thermoplastic food casing has an oxygen barrier effect.

9. The thermoplastic food casing according to claim 1, wherein the monolayer casing or the inner layer of the multilayer casing comprises a polyolefin and/or a polyamide.

10. The thermoplastic food casing according to claim 1, wherein the inside surface of the innermost layer shows a wetting tension of 35 mN/m or more as measured according to DIN ISO 8296.

11. A method for producing the (co)extruded thermoplastic food casing as defined in claim 1, comprising the step of subjecting a (co)extruded casing to at least one mechanical and thermal treatment so as to generate on an inside surface a textured surface having a three-dimensional pattern.

12. A method for producing the (co)extruded thermoplastic food casing as defined in claim 1, comprising a step of subjecting a (co)extruded casing to at least one mechanical and thermal treatment so as to generate on an outside surface a textured surface, coating the outside with a transferable functional additive followed by an optional drying step and a subsequent reversing step of turning the casing inside out.

13. The method for producing the (co)extruded thermoplastic food casing according to claim 11, further comprising the step of subjecting the (co)extruded or laminated casing in the state of a flat film to at least one mechanical and thermal treatment so as to generate on an inside surface a textured surface, coating this food contact side with a transferable functional additive followed by an optional drying step and a subsequent sealing step to create a tubular casing with the coated transferable functional additive inside.

14. The method for preparing the (co)extruded thermoplastic food casing according to claim 11, further comprising the step of subjecting the (co)extruded thermoplastic food casing to a mono-axial or bi-axial orientation treatment prior to the step of subjecting the (co)extruded casing to the at least one mechanical and thermal treatment.

15. The method for preparing the (co)extruded thermoplastic food casing according to claim 11, further comprising an embossing step, which takes place in the thermoplastic state of the material of the food contact layer to generate a textured surface on the food contact surface of the (co)extruded thermoplastic food casing.

16. The method for preparing the (co)extruded thermoplastic food casing according to claim 11, further comprising the step of applying a functional additive onto the textured surface of the (co)extruded thermoplastic food casing.

* * * * *